Figure 5:
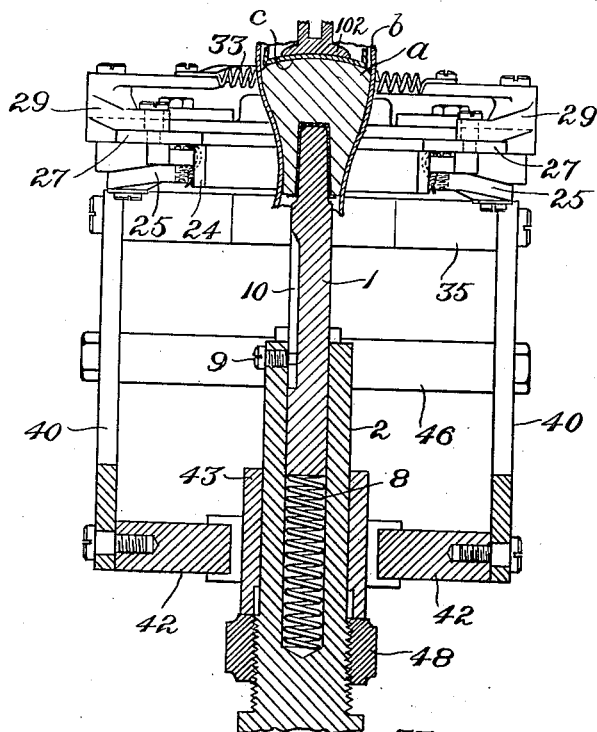

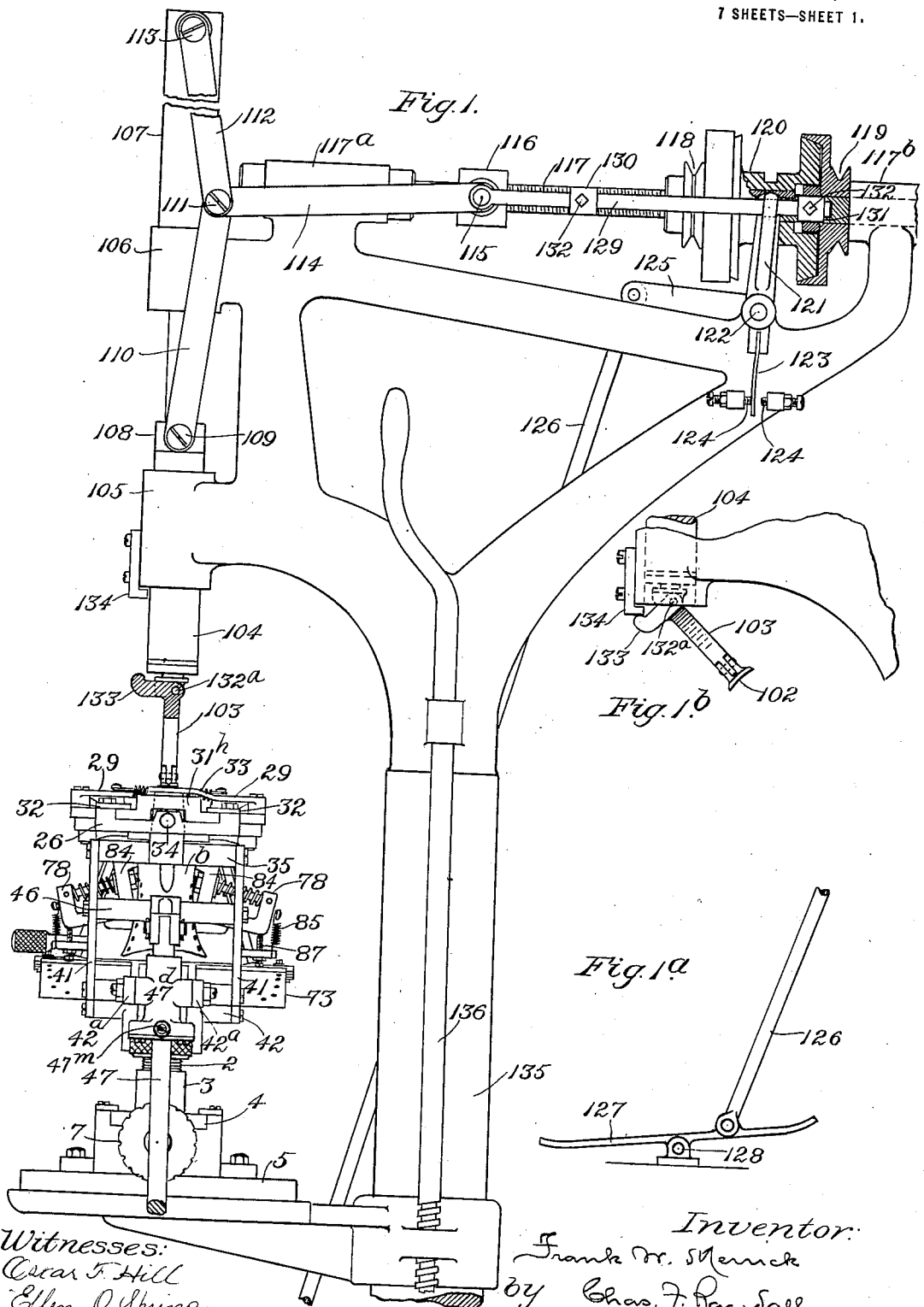

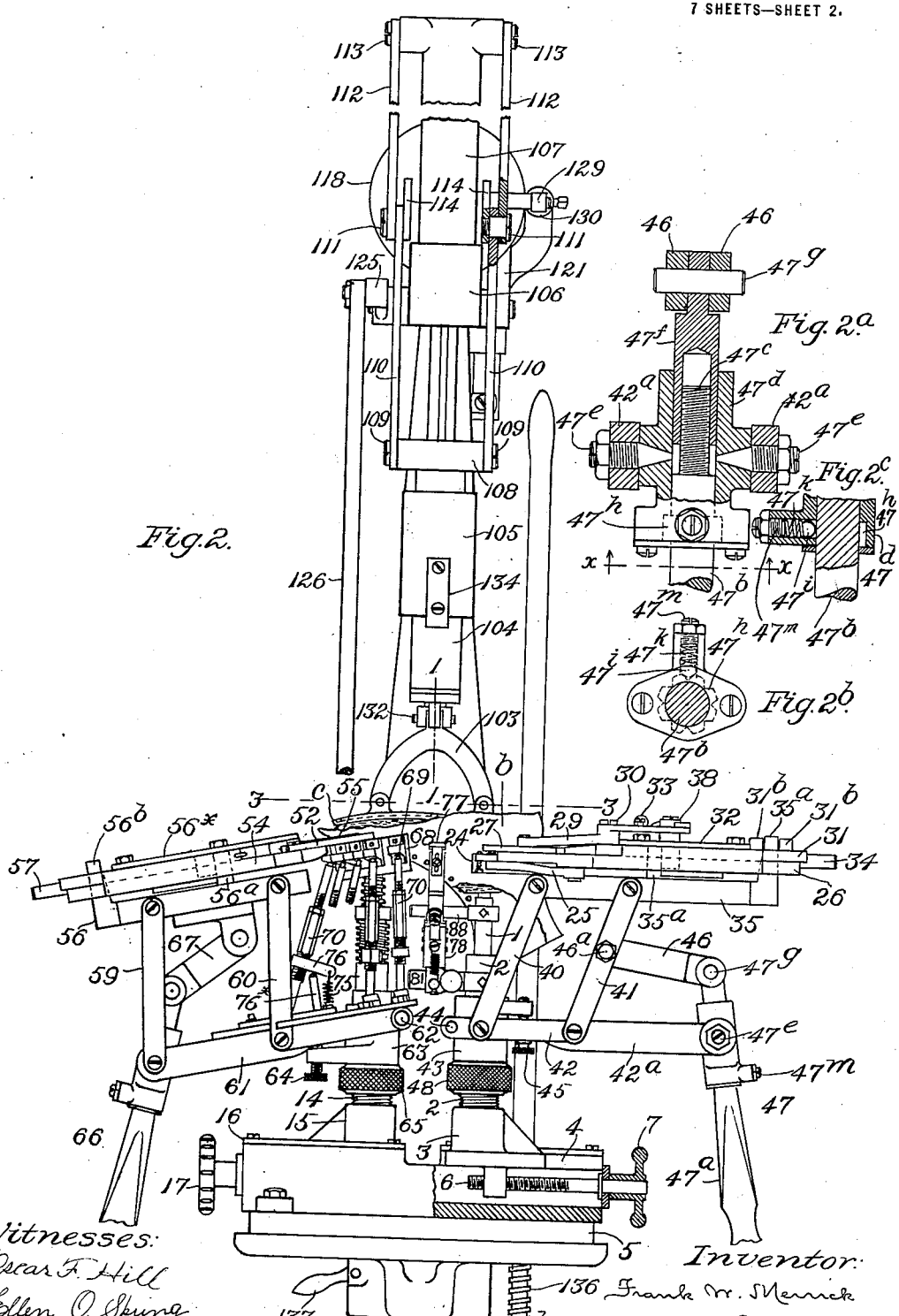

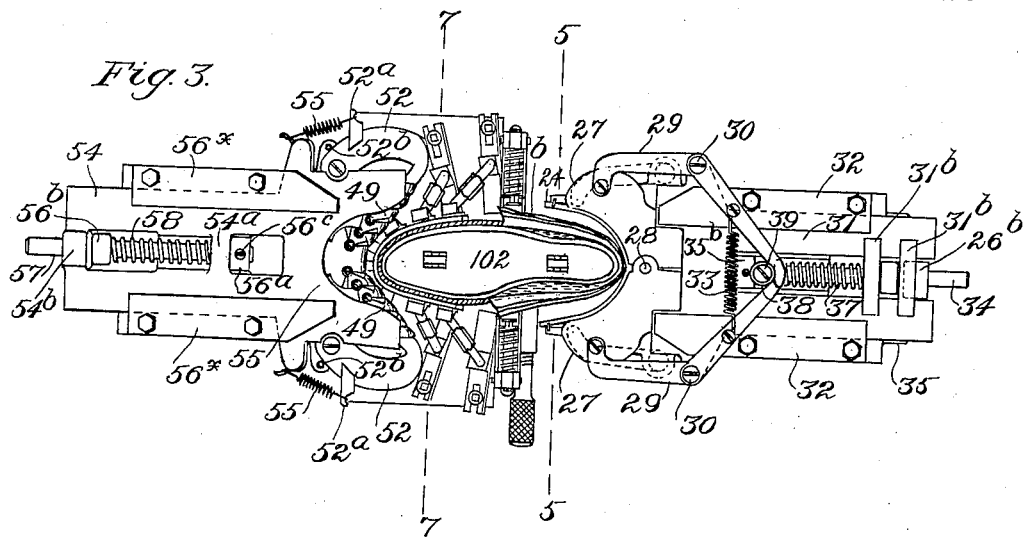
F. W. MERRICK.
LASTING MACHINE.
APPLICATION FILED APR. 28, 1913.
1,245,117.
Patented Oct. 30, 1917.
7 SHEETS—SHEET 3.

F. W. MERRICK.
LASTING MACHINE.
APPLICATION FILED APR. 28, 1913.

1,245,117.

Patented Oct. 30, 1917.
7 SHEETS—SHEET 4.

Witnesses:
Oscar F. Hill
Ellen O. Spring

Inventor:
Frank W. Merrick
by Chas. F. Randall
Attorney.

F. W. MERRICK.
LASTING MACHINE.
APPLICATION FILED APR. 28, 1913.

1,245,117.

Patented Oct. 30, 1917.
7 SHEETS—SHEET 5.

Witnesses:
Oscar F. Hill
Ellen O. Spring

Inventor:
Frank W. Merrick
by Chas. F. Randall
Attorney.

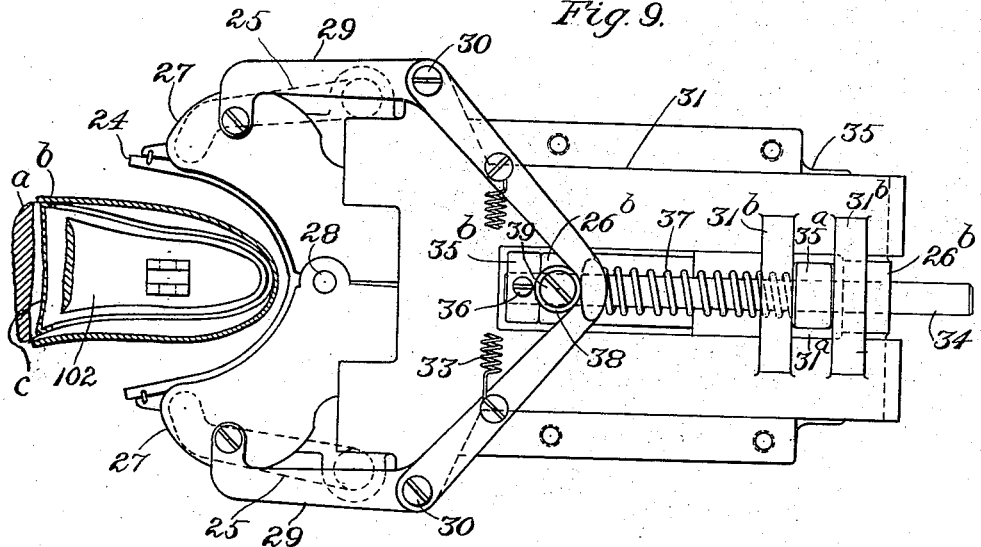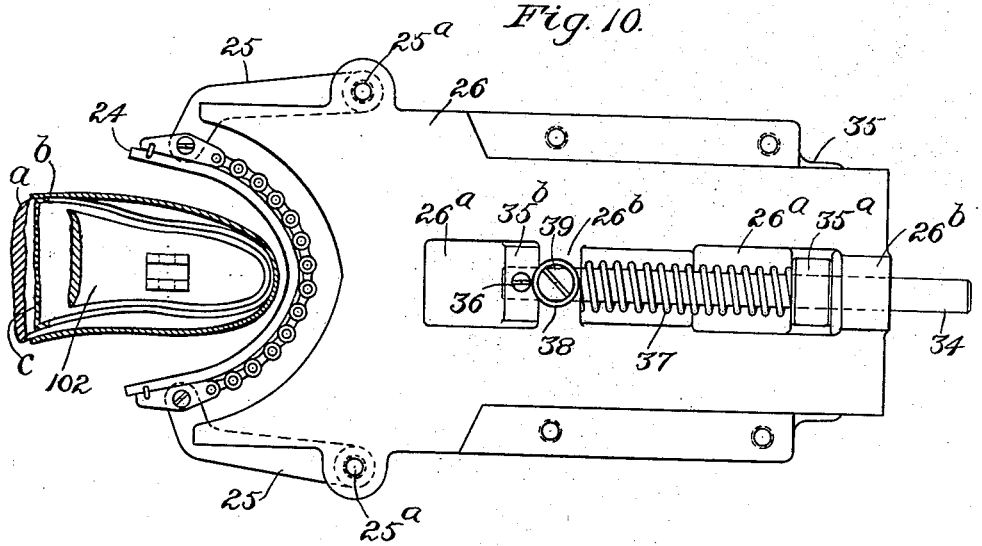

F. W. MERRICK.
LASTING MACHINE.
APPLICATION FILED APR. 28, 1913.

1,245,117.

Patented Oct. 30, 1917.
7 SHEETS—SHEET 7.

Witnesses:
Oscar F. Hill
Ellen O. Spring

Inventor:
Frank W. Merrick
by Chas. F. Randall
Attorney.

UNITED STATES PATENT OFFICE.

FRANK W. MERRICK, OF BOSTON, MASSACHUSETTS, ASSIGNOR TO UNION LOCK STITCH COMPANY, OF BOSTON, MASSACHUSETTS, A CORPORATION OF MAINE.

LASTING-MACHINE.

1,245,117.          Specification of Letters Patent.          Patented Oct. 30, 1917.

Application filed April 28, 1913. Serial No. 764,005.

*To all whom it may concern:*

Be it known that I, FRANK W. MERRICK, a citizen of the United States, residing at Boston, in the county of Suffolk, State of Massachusetts, have invented a certain new and useful Improvement in Lasting-Machines, of which the following is a specification, reference being had therein to the accompanying drawings.

An important characteristic of the machine herein shown and described is that the coming together or relative approach of the last and upper, or lasted shoe as it may be termed, and the lasting devices serves to bring about the wiping of the upper about the last, or in other words to actuate the lasting devices to wipe the upper about the last.

The actuation for the purposes of the relative approach is effected by power means of ample power in proportion to the weight of the parts to be actuated and to the resistance to be overcome in the performance of the work, such power means being fully sensitive to the control of the operator, and instantly responsive to his control so as to enable him to occasion the approach or promptly stop it at any instant, or as promptly reverse it. Consequently if, after the operator has set the mechanism at work to cause the lasted shoe and the lasting devices to come together, he should observe a wrinkle in the lining, a displacement of some part of the shoe, an improper adjustment or displacement of some part of the machine, or some other fault requiring attention before the lasting operation is proceeded with, he may instantly arrest the approach or coming together, and if necessary may reverse the action so as to ease up on the pressure between the shoe and the lasting devices or may reverse far enough to provide for separating the shoe from the lasting devices.

The invention includes various novel features, certain of which are embodied in the means aforesaid for occasioning and controlling the relative approach of the lasted shoe and the lasting devices, and others are embodied in and in connection with the lasting devices.

Convenient embodiments of the various features of the invention are illustrated in the drawing, in which latter,—

Figure 1 shows in side elevation, with certain small portions in section, a machine embodying the features of the invention, the lower portion of the supporting standard being omitted, and the section of the depresser or hold-down being on the line 1, 1, of Fig. 2.

Fig. 1$^a$ shows the treadle, omitted from Fig. 1, through which the operator controls the relative approach aforesaid.

Fig. 1$^b$ is a detail view showing the depresser or hold-down in rearwardly retracted position.

Fig. 2, Sheet 2, shows the machine in front elevation, with certain small portions in section or partly broken away.

Fig. 2$^a$ is a detail view partly in section and on an enlarged scale showing the construction and adjustment-provisions of one of the hand-levers for operating the heel and toe lasting devices.

Fig. 2$^b$ is a view in horizontal section on line $x$—$x$ of Fig. 2$^a$, looking upward.

Fig. 2$^c$ is a detail view of the adjustment devices partly in vertical section.

Fig. 3, Sheet 3, is a plan view of certain parts below the dotted line 3, 3, Fig. 2.

Fig. 4, Sheet 3, is a plan view on an enlarged scale of certain of the parts which are shown in Fig. 3, representing them as closed together upon a shoe.

Fig. 5, Sheet 4, is a view in vertical section on line 5, 5, of Fig. 3, the last and shoe thereon being elevated relative to the heel-lasting devices, and the latter open.

Figure 6:
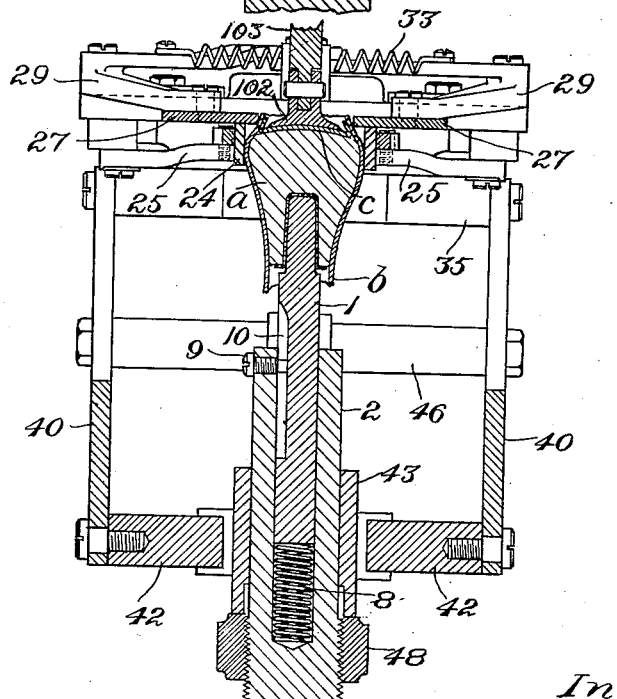

Fig. 6, Sheet 4, is a view in vertical section on line 6, 6, of Fig. 4, the last and shoe being depressed within the heel-lasting devices, and the said devices closed together upon the shoe.

Figure 7:
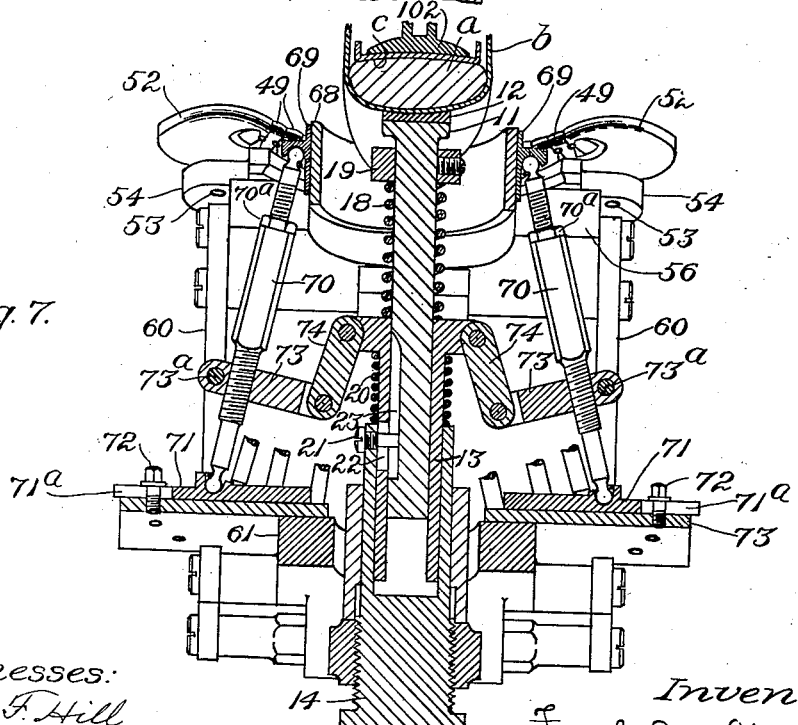

Fig. 7, Sheet 5, is a view in vertical section on line 7, 7, of Fig. 3, the last and shoe being elevated and the toe-lasting devices open.

Figure 8:
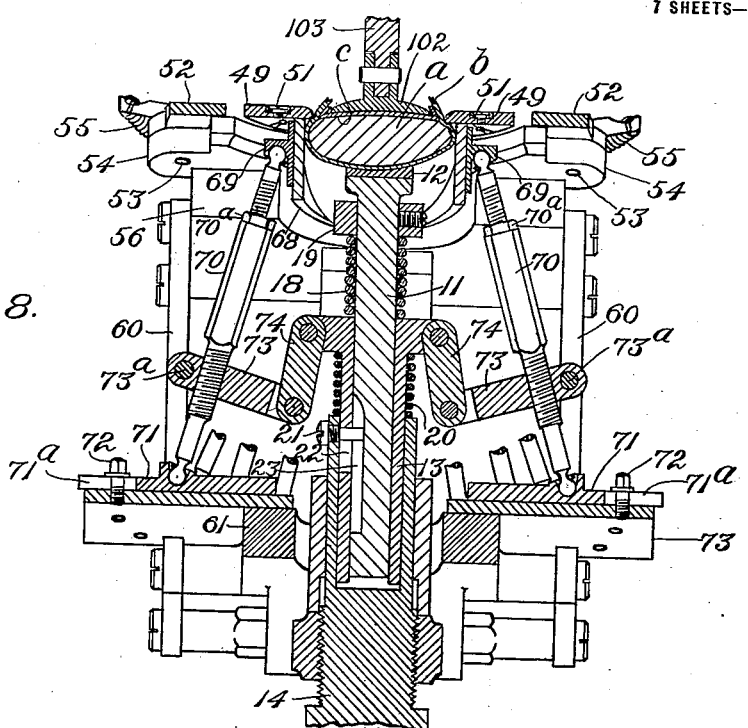

Fig. 8, Sheet 5, is a view in section on line 8, 8, of Fig. 4, the last and shoe being depressed within the nest of lasting devices, and the said devices being closed together upon the shoe.

Fig. 9, Sheet 6, is a view of the heel-lasting devices and portions of a last and shoe, on an enlarged scale and with the holding-down gibs removed, the said devices being in open condition.

Fig. 10, Sheet 6, is a plan view of certain of the parts that are represented in Fig. 9, with the heel wiper-plates, their carrying levers, and the carrying-plate for said levers, removed.

Figure 11:
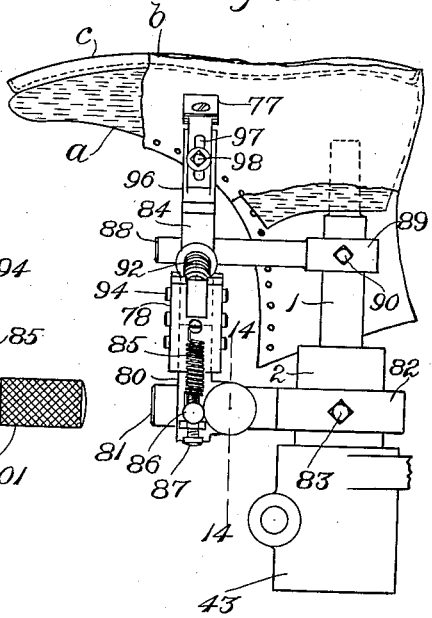

Fig. 11, Sheet 7, shows in front elevation the heel-pin, the supporting-post therefor, the waist or shank-lasting devices, and a last and portions of a shoe applied thereto, the last being elevated relative to the said lasting devices.

Figure 12:
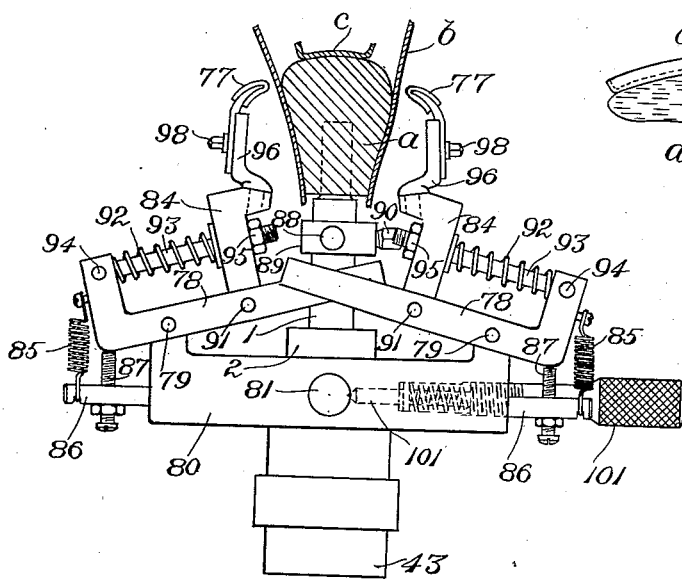

Fig. 12, Sheet 7, is a view looking from the left in Fig. 11, with the last and shoe thereon in vertical section.

Figure 13:
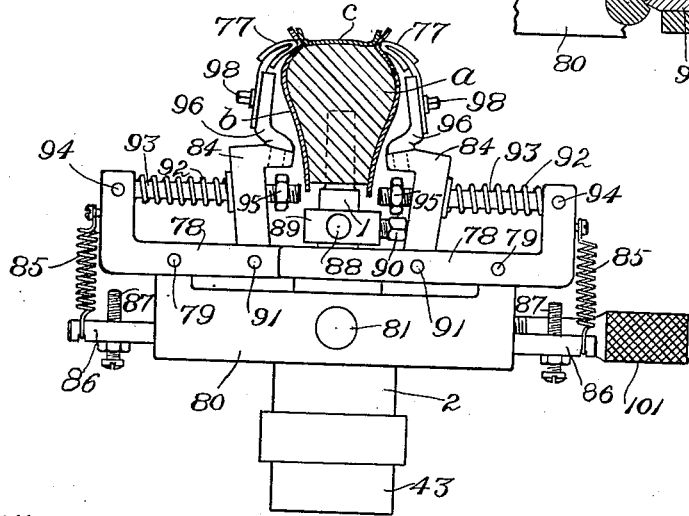

Fig. 13, Sheet 7, is a view similar to Fig. 12 but showing the last and shoe depressed and the waist or shank-lasters closed together upon the shoe and last.

Figure 14:
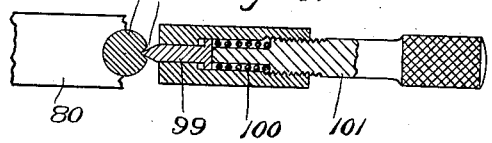

Fig. 14, Sheet 7, is a detail view, on an enlarged scale, of the means shown in Figs. 11 to 13 for keeping the waist or shank-lasters normally in a horizontal position.

Having reference to the drawings,—

In the various views in which the last and parts of a shoe are shown, the last is marked $a$, the upper $b$, and the insole $c$.

The last $a$ is mounted in the machine upon a heel-pin 1, Figs. 2, 5, and 6, that is carried by a post 2 upon a slide or carriage 3, (Fig. 2,) mounted in guide-ways 4 upon a bed or platen 5, the said slide or carriage being adjustable upon the bed or platen in the direction of the length of the last, to suit the size of the last and shoe, by means of an adjusting screw 6 provided with a hand-wheel 7. The socket with which the last is provided to fit the upper end of the heel-pin, as in Figs. 5 and 6, is located at the approximate center of the curve of the back of the heel.

The heel-pin 1 is elastically mounted in order that it may have capacity for vertical movement. In the present instance, as shown in Figs. 5 and 6, it occupies a socket in the upper portion of the post 2, and is supported within the said socket by means of an expanding spiral spring 8. The said spring holds the heel-pin normally in its elevated position, the upward movement of the heel-pin under the action of the spring being limited by means of a stop-screw 9 applied to the upper end of the post 2. The inner end of the said stop-screw enters a longitudinal groove 10 formed in the heel-pin, and the engagement of the said inner end with the shoulder at the lower end of the said groove serves to determine the extent of the rise of the heel-pin and consequently fix the normal position of the latter.

A toe-rest is shown at 11, Figs. 7 and 8, Sheet 5, it having applied to its top a cushion 12 of leather or other material to avoid injury to the surface of the upper $b$ which makes contact therewith. This toe-rest, like the heel-pin, is movable vertically and is elastically supported in an elevated normal position shown in Fig. 7. In this instance it is mounted with the lower portion of its stem within a sleeve 13, which in turn fits within a socket in the upper portion of a supporting post 14. The said post 14 is provided upon a slide or carrier 15, Fig. 2, mounted in guides at 16 upon the bed or platen 5, and by means of a screw and hand-wheel 17 made adjustable in the direction of the length of the last. The elastic support of the toe-rest is furnished partly by means of an endwise expanding spiral spring 18 that surrounds the stem of the toe-rest between a collar 19 fixed on said stem and the upper end of the sleeve 13, and partly by an endwise expanding spiral spring 20 which surrounds the sleeve between a shoulder at the upper end of the sleeve and the top of the post 14. The two springs coöperate in supporting the toe-rest in a manner which causes the latter to occupy normally its elevated position. A stop-screw 21 applied to the upper end of the socket in the post 14 projects through a slot 22 in the sleeve 13 into a longitudinal groove 23 in the stem of the toe-rest. This stop-screw serves to hold the sleeve and toe-rest from turning relative to the post, and also to limit the extent of the rising movement of the sleeve and toe-rest through engagement with the bottom of the slot 22 and with the shoulder which is formed at the lower end of the groove 23. In some cases I dispense with the toe-rest.

A last with shoe thereon applied to the heel-pin and toe-rest is supported thereby normally in elevated position relative to the lasting devices somewhat above the position that is indicated in Figs. 5 and 7. The spring-mountings of the heel-pin and toe-rest permit the last and shoe to be depressed within the circle of the lasting devices.

The toe-rest is caused to occupy a position in line vertically with the approximate center of the curve of the toe of the last.

The heel-lasting devices comprise in the present instance a heel-band and heel-wipers or crimping plates.

The heel-band 24, as shown more particularly in Fig. 4, Sheet 3, and Figs. 9 and 10, Sheet 6, is of well-known construction, and is mounted by means of swinging supporting arms 25, 25, upon the heel-band carrying plate 26, the said arms being pivoted to the said plate at $25^a$, $25^a$, Fig. 10.

The heel-wipers or crimping plates 27, 27, Figs. 3, 4, and 9, are of well-known character, they being pivotally connected together at 28 and pivotally mounted upon actuating levers 29, 29, which are pivoted at 30, 30, upon the heel-wiper carrying plate 31, Fig. 9. The latter plate rests upon the heel-band carrying-plate 26 and is held in place thereon by means of removable gibs 32, 32, Figs. 3 and 4, in manner providing for independent sliding movement of the heel-wiper plate 31 upon and with relation to the heel-band plate 26. The heel-wipers 27, 27, are held normally open or expanded as in Figs. 3 and 9 by means of a contracting spiral spring 33 connecting together the tail-portions of the wiper-actuating levers 29, 29.

To enable the heel-lasting devices to be swung or tipped bodily transversely, to suit or conform to the twist of the last, the plate 26 is mounted upon a longitudinal pin 34 carried by a carrier 35. The said pin 34 is mounted in lugs $35^a$, $35^b$, rising from said carrier, and entering openings $26^a$, $26^a$, in the plate 26, and is fixedly held in the lug $35^b$ by means of a clamping-screw 36. The plate 26 is mounted upon the said pin 34 by means of bearings at $26^b$, $26^b$, so that it is free to rock or swing or tip transversely.

For the purpose of enabling the heel-band and the wiper-plates 27, 27, to be caused to act upon the heel-portion of the shoe, the carrier 35 is movable lengthwise toward and from the heel-end of the last, and it is engaged with the two plates 26 and 31 in manner to actuate the latter in the same directions. In order that when the carrier 35 is moved toward the heel of the last the heel-band may be pressed yieldingly against the heel-portion of the upper on the last outside the counter of the shoe, an endwise expanding spiral spring cushion 37 is mounted on the pin 34 between one of the bearing-portions $26^b$ of plate 26 and the lug $35^a$ of the carrier 35. This spring acts to hold heel-band plates 26 longitudinally inward relative to the carrier 35 and heel-wiper carrying plate 31, with the inner bearing $26^b$ of plate 26 in contact with lug $35^b$ of the carrier 35. In the ingoing movement of the carrier 35 the said spring transmits pressure from the lug $35^a$ to the heel-band-plate 26 so that plate 26 moves in unison with said carrier until the heel-band brings up firmly around the heel-portions of the upper and last outside the counter of the shoe, and then the spring compresses during the remainder of the inward movement of the carrier, its tension continuing to hold the heel-band in close engagement with the heel-portions of the upper and last.

The lug $35^a$ of the carrier 35 also serves to actuate the heel-wiper plate 31 in a positive manner. To this end the said plate 31 is formed with a slot $31^a$, Fig. 9, between transverse bridging portions $31^b$, $31^b$. The lug $35^a$ enters the said slot, and by engagement with the said bridging portions causes the heel-wiper plate 31 and heel-wipers, 27, 27, to accompany the carrier 35 in the longitudinal movements of the latter.

The heel-wipers 27, 27, are caused to swing toward each other during the longitudinal inward movement of the carrier and the plates 26, 31, through the engagement of the tail-portions of the wiper-actuating levers 29, 29, with a roll 38 mounted upon a screw-stud 39 carried by the inner bearing-portion $26^b$ of heel-band plate 26. The said tail-portions overlap each other at the outer side of the said roll 38. The normal relations are as in Figs. 3 and 9. During the movement of the heel-band plate 26 and the wiper-carrying plate 31 inward in unison while the spring 37 holds the said inner bearing-portion $26^b$ of plate 26 in engagement with lug $35^b$ of the carrier 35, the spring 33, Fig. 9, holds the tail-portions of the wiper-carrying levers 29, 29, in engagement with the roll 38, with the wipers 27, 27, in their fully opened condition. When, however, the inward movement of the heel-band is arrested through contact with the last and shoe at the heel, so that the inward movement of its carrying-plate 26 ceases, the roll 38 remains stationary while the continued inward movement of the heel-wiper carrying plate 31 causes the tail-portions of the heel-wiper actuating levers 29, 29, to draw past the said roll 38 as in Fig. 4. The said tail-portions are curved at their extremities which make contact with the roll, and consequently in this continued inward movement of the heel-wiper plate 31 and heel-wipers the levers 29, 29, are caused to turn on their pivots 30, 30, and thereby close the heel-wipers 27, 27, toward each other. Fig. 4 shows the heel-wipers in their fully closed positions. In the subsequent outgoing movement of the carrier 35 the compressed spring 37 at first, through its tendency to expand, holds the heel-band pressed against the heel-portions of the upper and last. Meanwhile the movement of the heel-wiper carrying plate 31 in unison with said carrier carries the levers 29, 29, in the same direction relative to the roll 38 and relieves their pressure against the latter, so that the spring 33 is permitted to act to operate the said levers to open the heel-wipers apart from each other. The lug $35^b$ of carrier 35 then engages with the adjacent bearing $26^b$ and acts positively to cause plate 26 to accompany the carrier for the remainder of the outgoing movement of the latter.

The carrier 35 of the heel-lasting devices is movably mounted so as to be capable of inward and outward movement in the direction of the length of the last, and also of up and down movement. This capacity is secured by supporting the carrier 35 by means of pairs of parallel links 40, 41, upon a mounting 42 in connection with the slide or carrier 3 for the heel-pin. These parallel links cause the carrier 35 to remain parallel with its primary position throughout its entire range of movement. To provide for adjustment of the heel-lasting devices to suit the spring of the heel-portion of the last, the mounting 42 is constructed and supported in manner providing for adjustment of the carrier 35 into a horizontal position or into one at any desired inclination longitudinally. In the present instance, the mounting 42 is made U-shaped to extend on opposite sides of a sleeve 43, Figs. 2, 5, and 6, mounted upon the post 2. The side-arms of the said mounting are connected pivotally at 44, Fig. 2, with the said sleeve 43 so that the mounting 42 is capable of swinging movement vertically. It is adjusted into the required position with reference to the horizontal by means of an adjusting-screw 45, Fig. 2. The adjustment of the mounting by means of the said adjusting screw results in a corresponding adjustment of the carrier 35 and the heel-lasting devices. The parallel links 40, 41, insure movement of the lasting devices toward and from the last always in parallelism, so that after the carrier has been adjusted into a horizontal or inclined position corresponding with the spring of the heel-portion of the last, the movement of the lasting devices toward the last shall always cause such devices to act in a plane parallel to the general plane of the upper surface of the last and insole at and adjacent the heel.

The pivots connecting the parallel links 40, 41, with the mounting 42 and the carrier 35 are so related to the inward limit of the inward movement of the lasting devices that during the final portion of the wiping action, and after the margin of the upper has been wiped inward and crimped, the wipers shall move downward or descend more or less gradually upon the portions of said margins that are engaged thereby, so as to press such portions more forcibly and more directly against the bottom of the insole, thereby applying a gradually increasing pressure at the same time that they perform the regular wiping and crimping action. This produces a tendency to break down and set the leather snugly against the insole.

For the convenient actuation of the carrier 35 of the heel-lasting devices, enabling such devices to be moved outward away from the position of the last and inward again into position to perform the preliminary wiping operation, as well as for the purpose of enabling the said carrier to be actuated by the workman to cause the said lasting devices to effect the final wiping and crimping action, the pair of parallel links 41 is connected by a yoke-shaped connecting member or link 46, Figs. 2, 5, and 6, with the upper arm of a hand-lever 47 which is pivoted upon and between outward extensions $42^a$, $42^a$, of the mounting 42. By swinging movement of this hand-lever the workman is able to move the carrier 35 and heel-lasting devices inward into position for the said premilinary operation, and subsequently apply force to occasion the final wiping and crimping action and exert the direct pressure to break down and set the wiped-over and crimped portions of the upper. The relative proportions or lengths of the link 46 and the upper arm of the hand-lever 47, and the relations to one another of the pivots connecting said link to the links 41 and to the upper arm of the hand-lever, and the pivot supporting the said hand-lever upon the mounting, are such that the link 46 and the upper arm of the hand-lever constitute toggle-members and operate with a toggle-action and with progressively-increasing power in moving the heel-lasting devices inward with relation to the heel of the last. The final portion of the swing of the hand-lever to occasion such inward movement carries the pivotal connection $47^g$ between the link 46 and the upper arm of the hand-lever into line with the pivotal connection $46^a$ of link 46 with links 41 and the pivotal connection $47^e$ of the hand-lever with the extensions or arms $42^a$ of the mounting 42, this serving to exert the final powerful pressure and to lock the carrier in its inward position, maintaining the pressure of the wipers upon the crimped-over portions of leather.

For the purpose of enabling the range of the inward movement of the heel-lasting devices to be varied at will, the length of the toggle-member constituted by the upper arm of the hand-lever 47 is made adjustable. Referring more particularly to Figs. 2 and $2^a$, the hand-lever is formed in three parts. The first of these is a handle-portion $47^a$ having an upwardly extended spindle-portion $47^b$, the extremity $47^c$ of which is reduced and screw-threaded. The second is a hub-portion $47^d$, which receives the said spindle, this hub-portion being mounted upon cone centers $47^e$, $47^e$, carried by the extensions or arms $42^a$, $42^a$, of the mounting 42. The third is an adjustable connecting member $47^f$, which has its lower portion entered into the bore of the hub-portion $47^d$ and internally socketed and screw-threaded to receive and engage with the screw-threaded upper extremity $47^c$ of the spindle $47^b$. The upper portion of this connecting-member $47^f$ is flattened and fitted between opposite lugs of the link 46, it being connected with the said lugs by means of a pivot $47^g$. The handle-portion $47^a$ may be rotated by the workman, in which case the spindle $47^b$ will turn within the bore of the hub-portion, and when the handle-portion is rotated the screw-threaded connection between the spindle $47^b$ and the connecting-member $47^f$ operates to adjust the said piece $47^f$ in or out of the hub-member $47^d$ so as to decrease or increase the effective length of the upper arm of the hand-lever. Any convenient means may be provided for insuring against accidental rotation of the handle-portion 47ª. In the present instance, a notched wheel or collar 47ʰ, shown in dotted lines in Figs. 2ª and 2ᵇ, is provided upon the spindle-portion 47ᵇ, and in a radial hole in the lower portion of the hub 47ᵈ a ball 47ⁱ, shown best in Fig. 2ᶜ, is placed, the said ball being backed up by an endwise expanding spiral spring 47ᵏ, the tension of which is adjusted by means of an adjusting screw 47ᵐ. The engagement of the said ball in one of the notches of the wheel or collar 47ʰ operates to resist any tendency of the handle-portion 47ª to rotate accidentally, but the exertion of sufficient force by the workman will enable the said handle-portion to be rotated to the extent required.

The sleeve 43 by which the mounting 42 is supported is itself afforded vertical support by a collar 48 upon the post 2. The sleeve is revoluble upon the portion of the said post above the said collar, so that the heel-lasting devices may be swung transversely around the said post, and consequently around the axis of the heel-pin, into any position required to suit the swing of the last.

The position of the heel-lasting devices is made adjustable vertically by vertical adjustment of the collar 48 upon the post 2. This adjustment is provided for in the present instance by internally threading the said collar, as in Figs. 5 and 6, and fitting it to a screw-threaded portion of the post. The knurled exterior of the collar enables the collar to be readily turned by hand in making this adjustment.

The general construction and arrangement for supporting, adjusting, and operating the heel-wiper or crimping-plates is applicable also in connection with toe-wiper or crimping devices, and I have shown a substantially similar construction and arrangement applied in the latter connection. I may employ in practice any usual or preferred form and construction of toe-wiper or crimping devices, as, for instance, wiper-plates more or less closely approximating in character, construction, and means and mode of operation, the heel-wiper or crimping-plates 27, 27. I have shown, however, a form of toe-wiping and crimping devices which I prefer and embodying certain features of invention.

Referring now to the preferred construction of toe-wiper and crimping devices, and viewing more particularly Figs. 3 and 4, the immediate wiping or crimping agent is a flexible chain composed of a series of links 49, 50, 49, connected together by pivots 51 so as to be capable of free play or flexure in the plane of the chain. The end links also are engaged by pivots with two supporting arms 52, 52, which are mounted pivotally at 53, 53, upon the toe-wiper carrying plate 54 at opposite sides of the latter. The intermediate link 50 is larger than those at either side of it, and its back-portion rests upon the plate 54 so that the middle portion of the chain is thereby afforded vertical support. The chain is disposed in the form of a U-shaped bend, and normally is held expanded widthwise through the action of contracting springs 55, 55, which are engaged with projections 52ª, 52ª, from the arms 52, 52, and tend to move the arms away from each other, the extent of the separating movement being limited by means of stop-pins 52ᵇ, 52ᵇ, upon the plate 54. The arms 52, 52, rest upon extensions of the toe-wiper carrying plate 54 and are supported thereby against downwardly acting pressure. A cover plate 55 removably held in place upon plate 54 by detachable gibs 56ˣ, 56ˣ, projects over the middle link 50 and some of the side-links adjacent the arms 52, 52, and thereby holds the toe-wiper and crimping-chain downward against upwardly-acting pressure tending to force the chain upward.

The toe-wiper and crimping chain is a floating flexible device which accommodates itself to the shape and position of the toe-portion of the last. In other words, it conforms automatically to the shape and swing of the said toe-portion. Each of the links 49 thereof has a radial V-shaped notch, and an opposite radial V-shaped arm to occupy the notch of the next adjacent link, the said arm having an extension which overlaps the central portion of the latter link and occupies a counterbore therein as in Fig. 8, and the said extension and the said central portion having holes therein which receive the connecting pivot 51. The said pivot is a screw-pivot having the thread located on the lower portion of its stem to engage an internal thread of the central hole of the second link, a plain portion of the said stem being fitted within the hole in the overlapping extension of the first link. The outer and inner edges of the links are curved concentrically with respect to the centers of the pivots 51, as shown in Fig. 4, and inwardly concave-edged lateral portions of one link fit outside the curved convex edge-portions of the next link, so that the links overlap and work upon one another in the same plane without any opening or crack at the inner edge of the chain into which the upper can enter so as to be pinched and cut. The inner edges of the segments are rounded vertically so as to obviate injury to the upper leather by scraping or scratching the same during the wiping and crimping action. The supporting arms 52, 52, are connected with the terminal links 49, 49 by means of V-shaped projections and pivots, the said projections occupying V-shaped notches in the said terminal links. The connection between the large intermediate link 50 and the links 49, 49, next adjacent the same is effected by means of the V-shaped arms of the latter links occupying V-shaped notches at the opposite ends of the link 50, the said arms being engaged with the link 50 by pivots 51, 51, as shown.

The toe-wiper carrying plate 54 and the cover-plate 55 are mounted upon a carrier 56 by means of a longitudinal pin 57, upon which the plate 54 and parts carried by it are capable of rocking or tilting transversely to conform to the twist of the forepart of the last. The said pin is mounted in lugs 56$^a$, 56$^b$, on the carrier 56, and the plate 54 is furnished with bearings 54$^a$, 54$^b$, adapted to turn and slide on the said pin. The pin is fixed in the lug 56$^a$ by means of a clamping screw 56$^c$. Between the inner bearing, 54$^a$ of plate 54, and the outer lug, 56$^b$, of the carrier 56 the pin is surrounded by an endwise expanding spiral spring 58. This spring normally holds the toe-wiper carrying plate 54 pressed inwardly relatively to the carrier 56, with the bearing portion 54$^a$ pressed against the lug 56$^a$. When the carrier is moved longitudinally inward toward the toe of the last the toe-wiper plate moves in unison therewith until the working edge of the toe-wiper chain comes into contact with the upper around the toe-portion of the last. The spring 58 yields under continued inward movement of the carrier and its tension holds the chain pressed against the upper.

The carrier 56 of the toe-wiper devices is combined by means of pairs of parallel links 59, 60, with a mounting 61 that is pivoted at 62 to a sleeve 63 surrounding the upper portion of the post 14. The said sleeve is adapted to turn around the said post to enable the toe-wiper devices to be swung transversely in an arc concentric with the curve of the end of the toe of the last. This swinging movement, as will be apparent, is to enable the toe-wiper devices to be positioned properly to suit the swing of the forepart of the last.

To enable the plane of the toe-wiper devices to be adjusted with reference to the horizontal to suit the spring of the forepart of the last, the adjusting-screw 64 is applied to an arm extending out from sleeve 63, the said adjusting-screw engaging with the mounting 61 and serving to give the said mounting, the carrier 56, and the toe-wiper devices a greater or less degree of inclination. The internally threaded collar 65 fitted upon the screw-threaded lower portion of the post 14, and upon which the sleeve 63 rests vertically, provides for adjustment of the toe-wiper devices bodily up or down vertically to suit the last employed.

The longitudinal movement of the carrier 56 and the toe-wiper devices thereon toward and from the toe-portion of the last is provided for by means of a hand-lever 66 corresponding with the hand-lever 47 of the heel-lasting devices, and a link 67 connecting the upper arm of the said hand-lever 66 with the carrier 56. The mode of operation and means of adjustment in the case of the hand-lever 66 are the same as in the case of the hand-lever 47.

For the purpose of drawing the vamp snugly against the under portion of the last and causing it to fit against the surface of the said portion, any well-known or approved girth-device or vamp-stretcher device may be employed. I have shown a form of wiper-device comprising a wide band 68, Figs. 2, 7 and 8, of leather having its width disposed vertically, the said band being held in U-shape to extend horizontally about the fore-part of the last, and supported in a working position just below the toe-wiper and crimping chain 49, 50. For the support of the vamp-wiper band 68 small brackets 69, 69, are fastened to its outer side, these brackets having downturned sockets which receive the ball-shaped upper ends of posts 70, 70, having their ball-shaped lower ends entered into sockets in stands 71, 71, fastened by screws 72, 72, to a plate 73 on the mounting 61. Thereby the vamp-wiper band 68 is supported upon the mounting 61. In order to provide for adjustment of the height of the vamp-wiper band 68, or of different portions thereof, the posts 70, 70, are made adjustable in length. In this instance the adjustability is secured by making each post in two portions; namely, a lower portion having an internally threaded socket in its upper part, and an externally threaded upper portion screwing into the said socket and provided with a lock-nut 70$^a$ to prevent loss of adjustment. The posts 70, 70, at the ends of the band 68 are mounted upon the mounting 61 immediately above the pivotal axis on which the said mounting swings vertically. Consequently the said ends are not raised or lowered when the mounting is swung up or down. But when the mounting occupies its downwardly inclined position shown in Fig. 2, the band 68 as a whole occupies an outwardly and downwardly inclined position, its bend or bight being lowest. Consequently, after the last with a shoe thereon has been placed in position within the nest of lasting devices and has been pushed down within the vamp-band, if then the mounting 61 is swung upward from its inclined position in Fig. 2, the bend or bight of the vamp-band 68 will swing upward about the toe-portion of the last, pivoting about the tops of the posts at the ends of such band, thereby wiping the toe-portion of the vamp upward.

Referring more particularly to Figs. 7 and 8, the posts 70, 70, which are in line transversely with the stem of the toe-rest have inwardly extending arms 73, 73, mounted thereon, the said arms being connected by links 74, 74, to the upper end of the sleeve 13 surrounding the said stem. As has been described, the sleeve 13 normally is held in an elevated position by means of the spring 20. When the sleeve is elevated it acts through the described connections to hold the said posts outward and the sides of the vamp-wiper band 68 apart from each other. When the toe-rest is pressed down, compressing the spring 18 which rests upon the upper end of the sleeve 13 and thereby forcing the sleeve 13 down against the resistance of the spring 20, the downward movement which is transmitted from such sleeve through the links 74, 74, to the arms 73, 73, operates to swing the upper ends of the said posts inward, and the sides of the vamp-wiper band 68 toward and against the opposite sides of the upper surrounding the last for the desired wiping engagement therewith. Arms 73, 73, are made adjustable vertically upon the posts 70, 70, to which such arms are attached, to vary the extent to which the said posts are swung outward and the opposite side-portions of the vamp-band spread apart by the rise of sleeve 13. Also to vary the effect in pressing the side-portions of the vamp-wiper band 68 toward each other when the toe-rest is pressed downward. This adjustability is secured by forming an external screw-thread upon the lower portion of each post 70, and internally threading the holes in the arms 73 into which the posts fit. By turning the posts within said holes the arms are screwed up or down as required.

The remaining posts 70, 70, respectively are swung inward toward the vertical axis of the toe-rest by means of contracting spiral springs 75, Fig. 2, which are engaged with inwardly-projecting arms 76 upon the said posts, such arms corresponding with the arms 73 and being vertically adjustable upon the posts in the same manner as arms 73. The tension of the springs 75 operates to draw the said posts inward until the arms 76 make contact with stop-pins 76ˣ upon mounting 61. The said stop-pins determine the normal positions of such posts and of the corresponding portions of the vamp-wiper band 68. Such positions may be varied by vertical adjustment of the stop-pins, or by adjustment of the arms 76, 76, up or down upon the posts. This latter adjustment also varies the tension of the springs 75. By proper manipulation, the normal positions may be adjusted without varying the tension, and vice versa.

As a further means of enabling the wiping efficiency of the vamp-wiper band 68 to be varied, the stands 71, 71, Figs. 7 and 8, are made adjustable radially so that the posts 70, 70, may be set in positions more or less approximating vertical positions, or more or less inclining downwardly and outwardly from the vertical. For this adjustment the said stands 71 are slotted at 71ᵃ, 71ᵃ, to receive the stems of the screws 72, 72, the slots permitting the stands to be shifted radially as aforesaid. Referring to Figs. 7 and 8 as representing the inclination aforesaid of the posts, and it being assumed that as the last with shoe thereon is moved downward from its elevated position in Fig. 7, thereby depressing the toe-rest, the vamp-wiper band 68 will be closed inward against the upper at the sides of the last and around the toe-portion of the last, it will be understood that there will be friction between the vamp-wiper band and the upper. This friction will tend to carry the vamp-wiper band downward with the last and shoe. Any downward pressure upon the vamp-wiper band in Fig. 8 will naturally tend to cause the upper ends of the posts 70, 70, to swing downward and inward so as to approach each other more closely. Consequently, with the supporting posts 70, 70, set at converging inclinations as in Fig. 8, the frictional engagement between the upper and the vamp-wiper band, operating as aforesaid with a tendency to move the vamp-wiper band downward, will itself tend to cause the vamp-wiper band to press more firmly against the upper and toward the surface of the last and hence will correspondingly increase the wiping efficiency of the band. The greater the inclination of the posts, the more powerful will be the action; the more nearly vertical the posts, the less powerful will it be.

As a convenient means of preventing accidental displacement of the arms 73, 76, upon the threaded portions of the posts 70, 70, the internally threaded socket-portion of each of the said arms may be slitted vertically, and have a tightening bolt 73ᵃ combined with the portions at opposite sides of the slit to enable them to be drawn together so as to cause the internally threaded socket to bind upon the externally threaded portion of the post.

Waist-lasting devices embodying features of the invention are shown in place in the machine in Fig. 2, and separately in detail in Figs. 11, 12, 13 and 14 of Sheet 7. The said devices comprise opposite waist-wipers 77, 77, disposed in proper relation to the waist-portion of the last, and swinging carriers 78, 78, for the said wipers. The waist-wipers extend upwardly from the carriers, which are pivoted at 79, 79, upon a mounting 80 supported by a pin 81 extending from a collar 82 secured by a clamping-screw 83 upon the post 2 above the sleeve 43. The said mounting is adjustable along the pin 81, toward and from the heel-pin 1. The pivots 79, 79, are located at points at the front and rear sides, respectively, of the last. The waist-wipers 77, are carried by supports 84, 84, that rise from the carriers 78, 78, intermediate the position of the last and the pivots 79, 79. Contracting spiral springs 85, 85, connecting with the supports 78, 78, and with pins 86, 86, projecting from the mounting 80 operate to hold the carriers 78, 78, normally in the positions occupied by them in Fig. 12; namely, in engagement with adjustable stops 87, 87, projecting from said pins 86, 86, and with the wipers elevated. As thus elevated the said wipers are separated a distance greater than the width of a last.

For the purpose of causing the waist-wipers 77, 77, to close together against the opposite sides of the last so as to engage with the waist-portions of the upper surrounding the last and wipe the same upwardly, tightly and smoothly around the waist-portion of the last, the carriers 78, 78, are provided with inward extensions which cross below an actuating pin 88 carried by a collar 89 that is adjustably fixed at the required height upon the heel-pin 1 by means of a clamping-screw 90. At the proper point in the descent of the last with the upper thereon, the pin 88 strikes the crossing portions of the supports 78, 78, such portions being in its path, and by pressing such portions down it operates to swing the carriers 78, 78, upon their pivots 79, 79. This action operates in turn to swing the waist-wipers 77, 77, toward each other so as to close against the opposite sides of the last at its waist. By reason of the fact that the pin 88 engages with the extensions of the carriers 78, 78, at a greater distance horizontally from the pivots 79, 79, than the pivots 91, 91, connecting the supports 84, 84, of the waist-wipers 77, 77, with carriers 78, 78, it follows that although the downward swinging movement of the wiper-carriers 78, 78, causes the waist-wipers 77, 77, to move downward simultaneously with the last, the said wipers move downward a less distance than the last and at a slower rate of speed. Consequently, the net result is that the last descends between the waist-wipers faster than the latter descend, so that as a result of the differential movement the waist-wipers act to wipe the waist-portions of the upper upwardly about the waist-portion of the last.

In order that the movement of the waist-wipers 77, 77, downward and toward the last may occasion a yielding pressure of the said wipers against the upper, the supports 84, 84, of the wipers are pivoted as at 91, 91, to the carriers 78, 78, and are backed up by endwise expanding springs 92, 92. These springs are mounted upon pins 93, 93, which are pivoted by their outer ends at 94, 94, to upturned portions of the carriers 78. The screw-threaded inner ends of the said pins pass through holes in the pivoted supports 84, 84, and are furnished with stop-nuts 95, 95, to limit the extent of the inward movement of the said pivoted supports under the action of the springs 92, 92. The said springs surround the pins 93, 93, between the pivoted supports 84, 84, and the said upturned portions of the carriers 78, 78.

In order that the waist-wipers 77, 77, may conform to the direction of the sides of the last at the waist, they are mounted with capacity to swivel transversely. To this end the little stands 96, 96, to which the said wipers are attached are connected with the pivoted supports 84, 84, by means of pintles at their lower ends fitting sockets in the pivoted supports 84, 84. This mode of mounting the wipers upon the pivoted supports enables them to swivel in a horizontal direction. The shanks of the waist-wipers 77, 77, are slotted lengthwise at 97, Fig. 11, for the passage of the stems of the bolts 98, 98, which attach the wipers to the stands 96, 96. This permits an adjustment of the said wipers up and down upon their carrying means.

The mounting 80 for the waist-lasting devices is caused to tend to remain normally in horizontal position, but is adapted to be swung vertically in either direction when required, as for instance to enable the relative position of the waist-wipers 77, 77, to conform to the differences between right and left lasts respectively. A simple arrangement for causing the mounting 80 to remain normally in horizontal position while permitting it to be swung with slight effort is shown in Figs. 11 to 14. In these views the supporting pin 81 is formed with a longitudinal V-shaped groove 81$^a$, Fig. 14, in one side thereof and within a socket in a portion of the carrier 80 is contained a conically pointed pin 99. This pin is capable of sliding lengthwise within the said socket, its headed end being acted upon by an expanding spiral spring 100 which presses the pin endwise so that the tip of its conical point shall enter and remain in the V-groove 81. While the tip of the pin is held in the V-groove, the effect is to cause the carrier to remain normally in its horizontal position, but upon the application of sufficient force to the parts tending to swing the carrier vertically in one direction or the other the inclination of the side of the groove 81 against which the tip of the pin 99 will be carried by the swinging movement will press the pin back endwise against the resistance of the spring, allowing the carrier to be rocked. If the swinging movement of the carrier is not great enough to shift the point of the pin 99 entirely out of the V-groove 81ª, the carrier will be returned automatically to its normal position when free to do so. In order to enable the carrier to be locked positively in its normal position when desired, a screw-threaded pin 101 has its threaded portion fitted to the internally threaded portion of the socket in the carrier 80. A prolongation of the said screw-threaded pin passes through the center of the spring 100, and when the screw-threaded pin is screwed inward within the socket, the end of this reduced prolongation presses against the head of the pin 99 so as to force the point of pin 99 fully home into the V-groove 81ª in the supporting-pin 81. To facilitate the turning of the screw-threaded pin 101 for the purpose just explained its projecting outer end is knurled to enable a better grasp of the same to be had by the workman.

The normal position of the heel-pin and toe-rest, elevated above the nest or circle of lasting devices, facilitates the application thereto of a last with shoe upper, etc., thereon. When first applied the last and shoe stand up more or less above the lasting devices, in full view and sufficiently clear of such devices to enable the operator to adjust the upper or lining or otherwise prepare for the lasting. While the last and shoe are thus relatively elevated, the carrier 35 of the heel-lasting devices may be shifted by hand toward the last so as to place the said devices in working relations with respect to the heel-portion of the shoe; that is to say, against or close to the upper around the smaller portion of the last below the swell or enlargement of the heel. In like manner, the carrier 56 of the toe-lasting devices may be shifted by hand toward the last so as to place the latter devices in working relations with the toe-portion of the shoe; that is to say, somewhat in under the overhanging, side-portions and toe-portion of the forepart of the last.

For the purposes of the lasting operations the last and shoe are depressed within the nest or circle of the lasting devices, so as to cause the latter to wipe the different portions of the upper upward smoothly about the last. I provide for the purpose a device which constitutes both a depressor and a hold-down. In addition to forcing the last and shoe down within the nest or circle of the lasting devices, as aforesaid, for the purpose of effecting the preliminary wiping operation, it serves to hold the last and shoe down while the final operations are being performed.

The depressor or hold-down 102 is connected by means of a yoke 103, Figs. 1 and 2, with the lower end of an upright plunger-rod 104 which slides in fixed guides 105, 106, in connection with the upper portion of the machine frame-work. The upper portion of the said plunger-rod working in the fixed guide 106 is of reduced diameter and enters an upward extension 107 of said guide. The plunger-rod and the presser or hold-down may if desired be arranged to be actuated by the power of the workman, conveniently applied, but preferably I utilize mechanical power applied at the will of the workman. To this end a block 108 is mounted upon the lower portion of the reduced part of the plunger-rod, the said block resting against the shoulder at the top of the large lower portion of the plunger-rod, and to the opposite sides of this block are connected by pivots 109, 109, the lower ends of the lower links or members 110, 110, of a pair of actuating toggles. The upper ends of the said links or members 110, 110, are connected by pivots 111, 111, to the lower ends of an upper pair of toggle-links or members 112, 112, the upper ends of which in turn are connected by pivots 113, 113, to the upper end of the extension 107 of the guide 106 for the plunger-rod. For the actuation of the toggles, the intermediate pivots 111, 111, thereof are connected by links 114, 114, to pivots 115, 115, at opposite sides of a traveler nut 116, on an actuating screw 117. The said screw is suitably journaled in bearings 117ª, 117ᵇ, in the upper part of the machine frame and is provided with means for rotating it in either direction so as to operate the traveler-nut and toggles as required for the purpose of moving the depressor or hold-down down or raising it.

The duplication of the toggles at opposite sides of the plunger-rod, and the connection of the respective toggles to the respective sides of the traveler-nut, are designed to secure balanced action and to avoid tendency to turning of the plunger-rod and depressor or hold-down, and cramping of the actuating connections.

For the convenient actuation of the screw 117 by power, I provide, preferably, a reversible drive mechanism, which in this latter instance is of a well-known type, it comprising pulleys 118, 119, grooved for the reception of driving bands and mounted to turn loosely upon the plain portion of the shaft of the said screw beyond the screw-thread. The said pulleys are in practice driven in opposite directions by a straight driving band and a crossed one, respectively. Gear-wheels loosely mounted upon the screw-shaft and driven in opposite directions by connecting gearing might be employed instead, as sometimes in practice. Upon the screw-shaft between the two rotating loose wheels 118, 119, is mounted a clutch-member 120 adapted to engage with either of the said wheels. The said clutch-member is splined to the screw-shaft, as usual, to cause it to turn in unison with the latter, while permitting it to be slid lengthwise thereon. Preferably, the coöperating portions of the loose wheels and the intermediate clutch-member are arranged to act by frictional engagement with each other, and in this instance are reversely cone-shaped as shown in Fig. 1, the sliding clutch-member being formed as a double cone, and the loose rotating wheels being cupped out to receive the engaging portions of the said sliding clutch-member. Other forms of frictional engagement may be utilized, or a positive clutch arrangement may be substituted.

The shifter or controller 121 for the movable clutch-member 120 is mounted pivotally at 122 upon the machine-frame. It is held normally in an intermediate position, with said clutch-member in a neutral position out of engagement with both wheels 118, 119, through the action of a leaf-spring 123. The said spring is carried by the clutch-shifter or controller, its free end being entered between contacts or abutments 124, 124, on the machine-frame. Movement of the clutch-shifter or controller to cause the shifting clutch-member to engage one or the other of the rotating wheels carries the spring against one or the other of the contacts or abutments. Thereby, the spring is bent, and thus it is placed under tension. When the clutch-shifter or controller is left free by the workman, the tendency of the spring to resume its normal form causes it, by pressure against such contact or abutment, to restore the shifting clutch-member to its normal intermediate position.

For the convenient manual control of the clutch-shifter or controller, an arm 125 thereof is connected by a rod 126 to a treadle 127, Fig. 1ª. The pivotal mounting 128 of the said treadle is located at an intermediate point in the length of the treadle, so that by rocking the treadle in one direction upon its fulcrum the clutch-shifter or controller and shifting clutch-member may be operated to connect one of the rotating wheels with the screw-shaft, to rotate the latter in one direction; and by rocking the treadle in the other direction the said shifting clutch-member may be caused to connect the other rotating wheel with the screw-shaft, to rotate the latter in the opposite direction. Thereby, the workman is enabled to control the actuation of the depressor or hold-down, so that he may at will cause the latter to descend, remain stationary, or ascend. The described driving connections for the screw-shaft enable the ascending or descending movement of the depressor or hold-down to be instantly arrested at any point, so that in case the workman should perceive anything to be wrong during the descent of the last and shoe within the lasting devices he can promptly arrest such descent and thus avoid or lessen injury to the shoe.

In order to automatically unclutch the driving connections of the screw 117 when the proper extent of movement of the plunger-rod and depressor or hold-down in either direction has taken place, the clutch-shifter or controller 121 is arranged to be controlled by the traveler nut 116. In this instance, a rod 129 is pivoted at one end to the traveler nut 116, and extends through a hole in an arm of the clutch-shifter or controller. The rod is free to slide through the said hole in moving with the nut, until a collar 130 or 131 upon the rod brings up against the said arm so that the further movement of the rod actuates the shifter or controller. The collar 130 is arranged to engage with the arm of the shifter or controller in the movement of the nut in one direction, and the second collar, 131, is arranged to engage the shifter or controller in the movement of the nut in the other direction. This arrangement makes the machine self-stopping when the proper limit of movement of the plunger rod or depressor and hold-down in either direction has taken place, and effectually safe-guards against inadvertent overcontinuance of the pressure of the operator's foot upon the treadle. Even though the operator's foot should remain pressed upon the treadle, holding the latter in one or the other of its extreme positions, the engagement of one of the collars on the rod with the clutch-shifter or controller will automatically unclutch the driving connections from the screw-shaft, so that the endwise movement of the plunger-rod and presser or hold-down shall be automatically discontinued at the pre-arranged limit. The collars are fastened in place upon rod 19 by clamping screws 132, 132, so that the collars may be adjusted to vary the limits in either direction.

The combination of screw, and toggles actuated by the screw, produces extreme power. If the outgoing movement of the traveler nut 116 which occasions the lifting action of the plunger-rod and depressor or hold-down should be continued too long through inattention or inadvertence of the operator in maintaining the pressure of his foot upon the treadle the machine would be strained or broken. This, and injury such as would result from too long continuance of the depressing action of the lifter rod, are effectively safeguarded against by the provisions for automatically unclutching the driving connections of the screw 17 when the proper extent of movement of the plunger rod and depressor or hold-down in either direction has taken place.

In order to cause the depressor or hold-down or presser to move out of the way when it is separated from the lasting devices, so as to afford ample clearance for the insertion or removal of a last and shoe thereon, and also leave the operator free to use the necessary tacking or other fastening means, the depressor or hold-down is movably mounted in connection with the plunger-rod, and has combined with it means for causing it to assume a position at the rear as it rises. In the present instance, the yoke or carrier 103 of the depressor or hold-down is connected pivotally at 132ª to the plunger-rod, Figs. 1, 1ᵇ and 2, and has a forwardly projecting finger 133 intended to co-act with a stop-piece 134 attached to the lower guide, 105, for the plunger-rod. The upward movement of the plunger rod carries the said finger of the depressor or hold-down against the said stop-piece, with the result that the depressor or hold-down is swung rearward into the position shown in Fig. 1ᵇ. When the plunger rod is actuated to cause the same to descend, the descent of the plunger rod carries the finger away from the stop-piece, and the depressor or hold-down or presser swings into position to act against the insole of a shoe or the bottom of the last. A spring is employed in practice to assist the return of the hold-down or presser to working position.

It will be perceived that the invention includes a depressor or hold-down which is automatically stopped at either predetermined limit of its movement, and which may be instantly stopped and reversed at any point of its movement in either direction. Extreme watchfulness or care on the part of the operator during the depression of the shoe into the lasting devices is not essential, because the machine itself determines when the depressing function, and consequently the wiping action, has been properly completed.

The described construction of the machine enables the operator to occasion the automatic depression of the depressor or hold-down, and, if he so desires, to instantly arrest the descent thereof and of the shoe engaged thereby as soon as the top surface of the insole has reached the proper position with reference to the lasting devices. While the machine has this capacity, it is preferred to utilize the toggle action to the powerful termination of its stroke, and to utilize the automatic arrest of the descent of the presser. The automatic stopping devices are designed to make sure that the depressing action shall be arrested or stopped when the toggle is on the center. The stopping point of the presser in its descent determines the position of the upper surface of the insole of the shoe.

The resistance increases as the last and shoe pass down within the lasting devices. The actuating mechanism compensates for this in virtue of the fact that the power increases up to the limit of the strength of the metal of which the parts of the machine are composed. This is attained without in any way affecting the delicacy of the operator's control over the actuation. In an ordinary machine the increasing resistance causes the machine to strain and labor. The operator is enabled at will to close the friction-clutch members of the said actuating mechanism together with moderate pressure so as to permit slipping to occur in case of undue resistance, or he may force them together so that slipping will be absolutely impossible. In this manner the driving of the machine is subject to special control. I secure the combination of unlimited actuating power for the depressor or hold-down, and optional application of that power enabling me to graduate the amount of power to what the leather will stand. I am enabled to approach infinity at either limit. In case the leather of the upper is weak, delicacy of action can be secured by the operator; if it is otherwise, he can apply the power proportionately. By the simple control of the treadle the operator can squeeze a leather of no greater strength than a piece of paper without tearing it, or he could bite off a piece of sole leather. If the operator is aware of a weak place in the upper which he is operating upon, he can humor it by softening the action until such place has passed down below the lasting devices, and then he can apply greater power to suit the greater strength of the succeeding portion of the upper.

Reference has been made to the fact that the heel-post and toe-rest are carried by supports on slides which are adjustable by hand-screws toward and from each other in guides on a bed or platen, 5. The said bed or platen is sleeved upon a cylindrical upright portion 135 of the machine frame and adjustable vertically, this vertical adjustment enabling the lasting devices to be shifted vertically with relation to the lower limit of the movement of the depressor or hold-down. This vertical adjustment is effected by means of a hand-operated adjusting screw 136, and serves to shift the bed or platen vertically upon the main supporting standard. The bed or platen is made fast in its position of adjustment by means of a clamp operated by a handle 137, Fig. 2. The vertical adjustment of the bed or platen renders it possible to adjust the heel and toe lasting devices upon the bed to suit the spring of the last, or otherwise, and then, by vertical shift of the bed and parts carried thereby, adjust the limit of approach without touching the adjusting devices of either the heel or the toe lasting devices. Thereby, for instance, compensation may be made for a uniform increase or decrease in the thickness of the upper leather all around the shoe, or other difference that is uniform all around the shoe.

The approach of the lasted shoe and the lasting devices serves to actuate the lasting devices to wipe the upper about the last, in the sense that as the last and the upper outside of it are entered within the nest of lasting devices, such entrance causes the lasting devices to conform to the contour of the last, and forces such devices outward as the larger portion of the last presents itself. The upper, being between the last and the lasting devices, is thereby wiped in position upon the last. The equalizing device in connection with the forepart lasters operates to bring the last and shoe to central or mid-position. Thereby the pressure and consequent frictional engagement of the lasting devices with the opposite side-portions of the upper are rendered equal, and tendency to pull the upper to one side out of place is obviated.

In sequence, the chain-wiper acts first yieldingly to wipe the upper around the toe-portion of the last, this action being succeeded by that of the vamp-band 68, which is more positive in its action, and that being succeeded by the final positive crimping and crushing action of the toe-wiper chain.

The purpose of the adjustment in connection with the hand-levers 47 and 66 is to enable the operator to get a sufficient extent of inward movement of the crimping devices to give the required pressure. If when the toggle in connection with either of the said hand-levers has straightened the pressure is not sufficient, the corresponding lasting devices are backed off, and by turning the handle portion of the lever the upper arm of the lever is lengthened, the lever being then operated as before. If there is too much pressure, the reverse adjustment will be effected. The parts should be so set and the hand-lever so adjusted that in arriving at full pressure the toggle-joint will straighten. The toggles in connection with the hand-levers enable great power to be secured in operating the crimping devices.

As described, the toe wiper chain is mounted upon a support which is both spring-cushioned and positively actuated. The spring 58 by yielding prevents injury to the upper. The hand-lever toggle-arrangement is so powerful that the operator would be unable to feel any undue pressure between the last and the chain, and in consequence if the action were entirely positive the continued descent of the last might operate to break or cut the upper. The spring by yielding allows the wiping and crimping chain and its carrier to give so as to avoid injury to the upper, and its movement, being observable by the operator, serves as an indication to him that the chain has been set too far back, enabling him to back off sufficiently to obviate injury to the upper. In the final operation in toe-lasting, upward strain is exerted against the wiper-chain, which strain is sustained by the cover-plate. This strain is experienced in lasting for a welt shoe or a McKay shoe; that is to say, in a shoe having the upper wiped over the edge of the last and insole. In the case of a stitch-down shoe the final strain would be downward.

The waist lasters wipe the upper upward until it is pressed against the upturned flange of the insole. Then the said devices yield and are carried down by the pressure. In practice, in lasting a stitch-down shoe the flange or skirt of the upper is turned downward over the upper ends of the waist lasters, so that the said upper ends serve to support the flanges of the upper and insole and the sole laid thereon, thereby enabling the sole to be secured in place by cementing.

In the preliminary wiping operation, the heel-band performs in connection with the heel-portion of the upper an upward wiping action similar to that performed by the vamp-band 68 in connection with the forepart of the upper.

I claim as my invention,

1. A lasting machine having, in combination, a presser or hold-down for a last having an upper of a shoe applied thereto, lasting devices actuated to draw the upper into place around the last by the coming together or relative approach of the last and upper and the lasting devices, and means for actuating said devices at will independently of the said coming together or relative approach to effect the final operations at the bottom of the last.

2. A lasting machine having, in combination, a presser or hold-down for a last having an upper of a shoe applied thereto, lasting devices actuated to draw the upper into place around the last by the coming together or relative approach of the last and upper and the lasting devices, said devices comprising heel and toe wipers, and means for manually actuating said devices independently of the said coming together or relative approach to effect the final wiping and crimping of the upper at heel and toe.

3. A lasting machine having, in combination, a presser or hold-down for a last having an upper of a shoe applied thereto, lasting devices actuated to draw the upper into place about the last by the entry of the last and upper within the lasting devices, and power means for causing such approach, adapted to be rendered operative, and inoperative, and reversed, at the will of the operator, enabling him to occasion the approach or promptly arrest it, or back off.

4. A lasting machine having, in combination, lasting devices actuated to draw an upper about a last by the entry of a last having such upper applied thereto within the lasting devices, and slow-speed power means for causing such coming together, adapted to be rendered operative and inoperative, and to be reversed, all at the will of the operator, enabling him to occasion the coming together or promptly arrest it, and back off.

5. A lasting machine having, in combination, lasting devices, a screw and nut, actuating means in connection therewith, under the control of the operator, and means operatively combined with the said screw and nut through which to occasion the entry of a last with upper thereon within the said lasting devices.

6. A lasting machine having, in combination, lasting devices, a screw and nut, actuating means in connection therewith, under the control of the operator, including a reversible drive mechanism, to occasion the entry of a last with upper thereon within the said lasting devices, arrest such coming together, and back off, at will.

7. A lasting machine having, in combination, lasting devices, a screw and nut, actuating means and connections, including unshipping and reversing devices, whereby under control of the operator to occasion the entry of a last with upper thereon within the said lasting devices, arrest such coming together, and back off, all at will.

8. A lasting machine having, in combination, lasting devices, a screw and nut, means operated thereby to occasion the coming together of a last with upper thereon and the said lasting devices, and a reversible drive with shipper whereby said screw and nut may be rendered operative to occasion the entry of a last with upper thereon within the said lasting devices, arrest such coming together, and back off, all at will.

9. A lasting machine having, in combination, lasting devices, a screw and nut, means operated thereby to occasion the entry of a last with upper thereon within the said lasting devices, and a reversible drive comprising wheels by which movement of rotation in opposite directions is communicated, and controlling means for rendering at will either of said wheels operative to actuate said screw and nut or both of them inoperative.

10. A lasting machine having, in combination, lasting devices, a screw, means operated by said screw to occasion the entry of a last with upper thereon within the said lasting devices, and a reversible drive for said screw comprising wheels which rotate in opposite directions, and controlling means for rendering at will either of said wheels operative to actuate said screw, or both of them inoperative to actuate it.

11. A lasting means having, in combination, lasting devices, power-means for causing entry of a last with upper thereon within the said lasting devices, adapted to be rendered operative and inoperative at the will of the operator, enabling him to occasion the approach or promptly arrest it, and automatic means for arresting the application of power when the predetermined extent of movement has occurred.

12. A lasting machine having, in combination, lasting devices, power-means for causing entry of a last with upper thereon within the said lasting devices, adapted to be rendered operative and inoperative, and reversed, at the will of the operator, enabling him to occasion the approach, arrest, and back off, at will, and means for automatically arresting the application of power when the predetermined extent of movement in either direction has occurred.

13. A lasting machine having, in combination, lasting devices, slow-speed power-means for causing entry of a last with upper thereon within the said lasting devices, adapted to be rendered operative and inoperative, and to be reversed, all at the will of the operator, and means for automatically arresting the application of power when the predetermined extent of movement in either direction has occurred.

14. A lasting machine having, in combination, lasting devices, a screw and nut, means operatively combined with the said screw and nut through which to occasion the entry of a last with upper thereon within the said lasting devices, reversible power-driving means whereby at the will of the operator the said screw and nut may be actuated to occasion the coming together of a last with upper thereon and the said lasting devices, and reversely actuated for backing off, and means for automatically arresting the actuation of the said screw and nut when the predetermined extent of movement in either direction has occurred.

15. A lasting machine having, in combination, lasting devices, a screw and nut, means operatively combined with the said screw and nut through which to occasion the entry of a last with upper thereon within the said lasting devices, and the backing-off, a reversible drive whereby at the will of the operator the said screw and nut may be operated to cause said entry and the backing-off, and means for automatically disconnecting the driving-power when the predetermined extent of movement in either direction has occurred.

16. A lasting machine having, in combination, lasting devices, a screw and nut, means operated thereby to occasion the entry of a last with upper thereon within the said lasting devices, and the backing-off, a reversible drive for said screw and nut comprising wheels by which movement of rotation in opposite directions is communicated, and controlling means for rendering at will either of said wheels operative to actuate said screw and nut, and means for automatically disconnecting the said wheels from the screw and nut when the predetermined extent of movement in either direction has occurred.

17. A lasting machine having, in combination, lasting devices, a toggle, actuating means in connection therewith under the control of the operator at all stages in the coming together of the last and lasting devices, and means operatively combined with the said toggle through which to occasion the coming together of a last with upper thereon and the said lasting devices.

18. A lasting machine having, in combination lasting devices, a toggle, and power-driven actuating means in connection therewith under the control of the operator, including reversing mechanism, to occasion the coming together of a last with upper thereon and the said lasting devices, arrest such coming together, and back-off, all at will.

19. A lasting machine having, in combination, lasting devices, a toggle, and toggle-actuating means comprising shipping and reversing devices whereby the operator is enabled at will to occasion the coming together of a last with upper thereon and the said lasting devices, arrest such coming together, and back-off.

20. A lasting machine having, in combination, lasting devices, a toggle, and toggle-actuating means including a reversible drive comprising wheels by which movement in opposite directions is communicated to actuate the toggle reversely, and controlling means for rendering at will either of said wheels operative to actuate said toggle to either cause the coming together of a last with upper thereon and the said lasting devices, or the backing-off, or render both of said wheels inoperative and thereby leave the toggle at rest.

21. A lasting machine having in combination, lasting devices, a toggle, and toggle-actuating means including a reversible drive comprising wheels rotating in opposite directions to actuate said toggle reversely, and controlling means for rendering at will either of said wheels operative to actuate said toggle, to either cause the coming together of a last with upper thereon and the said lasting devices, or the backing-off, or render both of the said wheels inoperative to thereby leave the toggle at rest.

22. A lasting machine having in combination, lasting devices, a toggle, power-means for actuating said toggle to cause relative approach of a last with upper thereon and the said lasting devices, adapted to be rendered operative and inoperative at the will of the operator, enabling him to occasion the approach or arrest it, and means for automatically arresting the application of power to said toggle when the predetermined extent of movement has occurred.

23. A lasting machine having, in combination, lasting devices, a toggle, and power-means for actuating said toggle to cause relative approach of a last with upper thereon and the said lasting devices, adapted to be rendered operative and inoperative, at the will of the operator, enabling him to occasion the approach and arrest it, at will.

24. A lasting machine having, in combination, lasting devices, a toggle, and power-means for actuating said toggle to cause relative approach of a last with upper thereon and the said lasting devices, adapted to be rendered operative and inoperative, and reversed, at the will of the operator, enabling him to occasion the approach or arrest it, and back-off, at will.

25. A lasting machine having, in combination, lasting devices, a toggle, power-means for actuating said toggle to cause entry of a last with upper thereon within the said lasting devices, adapted to be rendered operative and inoperative, and reversed, at the will of the operator, enabling him to occasion the approach, arrest it, and back-off, at will, and means for automatically arresting the application of power to the toggle when the predetermined extent of movement in either direction has occurred.

26. A lasting machine having, in combination, lasting devices, a toggle, slow-speed power-means for actuating said toggle to cause entry of a last with upper thereon within the said lasting devices, adapted to be rendered operative and inoperative and to be reversed, all at the will of the operator, and means for automatically arresting the application of power to the toggle when the predetermined extent of movement in either direction has occurred.

27. A lasting machine having, in combination, lasting devices, a toggle, means operatively combined with the said toggle through which to occasion the entry of a last with upper thereon within the said lasting devices, reversible power-driving means whereby at the will of the operator the said toggle may be actuated to occasion the entry of a last with upper thereon and the said lasting devices, or reversely actuated for backing-off, and means for automatically arresting the actuation of the said toggle when the predetermined extent of movement in either direction has occurred.

28. A lasting machine having, in combination, lasting devices, a toggle, means operatively combined with said toggle through which to occasion the entry of a last with upper thereon within the said lasting devices, and the backing-off, a reversible drive whereby at the will of the operator the said toggle may be operated to cause said entry or the backing-off, and means for automatically disconnecting the driving-power when the predetermined extent of movement in either direction has occurred.

29. A lasting machine having, in combination, lasting devices, a toggle, means operatively combined with said toggle through which to occasion the entry of a last with upper thereon within the said lasting devices, and the backing-off, a reversible drive for actuating said toggle comprising wheels by which movement of rotation in opposite directions is communicated, and controlling means rendering at will either of said wheels operative to actuate said toggle, and means for automatically disconnecting the said wheels from the toggle when the predetermined extent of movement in either direction has occurred.

30. A lasting machine having, in combination, lasting devices, a toggle, a screw-actuator for said toggle, power-means for actuating said screw-actuator and thereby actuating the toggle to cause entry of a last with upper thereon within the said lasting devices, adapted to be rendered operative and inoperative at the will of the operator, enabling him to occasion the approach and arrest it, at will.

31. A lasting machine, in combination, lasting devices, a toggle, a screw-actuator for said toggle, power-means for actuating said screw-actuator and thereby actuating the toggle to cause relative approach of a last with upper thereon and the said lasting devices, adapted to be rendered operative and inoperative, and reversed, at the will of the operator, enabling him to occasion the approach, arrest it, and back off, at will.

32. A lasting machine having, in combination, lasting devices, a toggle, a screw-actuator for said toggle, and actuating means for said screw-actuator under control of the operator, including a reversible drive mechanism, to occasion the coming together of a last with upper thereon and the said lasting devices, arrest such coming together, and back-off, all at will.

33. A lasting machine having, in combination, lasting devices, a toggle, a screw-actuator for said toggle, and actuating means for said screw-actuator comprising shipping and reversing devices whereby the operator is enabled at will to occasion the coming together of a last with upper thereon and the said lasting devices, arrest such coming together, and back-off.

34. A lasting machine having, in combination, lasting devices, a toggle, a screw-actuator for said toggle, and actuating means for said screw-actuator including a reversible drive comprising wheels by which movement in opposite directions is communicated to actuate the toggle reversely, and controlling means for rendering at will either of said wheels operative to actuate said toggle, to either cause the coming together of a last with upper thereon and the said lasting devices, or the backing-off, or render both of said wheels inoperative and thereby leave the toggle at rest.

35. A lasting machine having, in combination, lasting devices, a toggle, a screw-actuator for said toggle, and actuating means for said screw-actuator including a reversible drive comprising wheels rotating in opposite directions to actuate said screw-actuator reversely, and controlling means for rendering at will either of said wheels operative to actuate said toggle, to either cause the coming together of a last with upper thereon and the said lasting devices, or the backing-off, or render both of the said wheels inoperative to thereby leave the toggle at rest.

36. A lasting machine having, in combination, lasting devices, a toggle, a screw-actuator for said toggle, power-means for actuating said screw-actuator to cause relative approach of a last with upper thereon and the said lasting devices, adapted to be rendered operative and inoperative at the will of the operator, enabling him to occasion the approach or arrest it, and means for automatically arresting the application of power to said toggle when the predetermined extent of movement has occurred.

37. In a lasting machine, in combination, a hold-down or presser, actuating means therefor adapted to enable said hold-down or presser to be instantly stopped and reversed at any point in its movement in either direction, and means for automatically stopping the said hold-down or presser at either predetermined limit of its movement.

38. In a lasting machine, in combination, a hold-down or presser, a plunger-rod with which the said hold-down is connected, a double toggle-mechanism connecting with said plunger-rod at opposite sides of the axis of the latter, and power-driven actuating means for the toggles under the control of the operator.

39. In a lasting machine, in combination, a hold-down or presser, a plunger-rod with which the same is connected, a double toggle-mechanism connecting with said plunger-rod at opposite sides of the axis of the latter, a traveler-nut and connections from the respective sides of the same to the respective toggles, and an actuating screw for said traveler-nut.

40. In a lasting machine, in combination, a hold-down or presser, an actuating toggle in connection therewith, a traveler-nut in connection with said toggle, an actuating screw for said traveler-nut, and a reversible drive-mechanism for said screw.

41. In a lasting machine, in combination, a hold-down or presser, an actuating toggle in connection therewith, a traveler-nut in connection with said toggle, an actuating screw for said traveler-nut, wheels which respectively rotate in opposite directions relative to each other, and means for operatively connecting the respective wheels with the actuating screw to rotate the latter in either direction at will.

42. In a lasting machine, in combination, a hold-down or presser, an actuating toggle in connection therewith, a traveler-nut in connection with said toggle, an actuating screw for said traveler-nut, wheels which respectively rotate in opposite directions relative to each other, and means for clutching the respective wheels with the said actuating screw at will.

43. In a lasting machine, in combination, a hold-down or presser, an actuating toggle in connection therewith, a traveler-nut in connection with said toggle, an actuating screw for said traveler-nut, a reverse-drive mechanism for said screw, and means for automatically disconnecting the driving power from the screw at the predetermined limit of movement of the parts in either direction.

44. In a lasting machine, in combination, a hold-down or presser, an actuating toggle in connection therewith, a traveler-nut in connection with said toggle, an actuating screw for said traveler-nut, a reverse-drive mechanism for said screw, and means operated by the traveler-nut to automatically disconnect the driving power from the screw at the predetermined limit of movement in either direction.

45. In a lasting machine, in combination, a hold-down or presser for a last, and a reversible-drive mechanism for actuating the same, including a friction-clutch adapted to be varied in its driving efficiency.

46. In a lasting machine, in combination, a hold-down or presser, an actuating screw in operative connection therewith, and actuating means for the said screw including friction-clutch devices adapted to be varied in driving efficiency to vary the force transmitted through the screw and connections to the hold-down or presser.

47. In a lasting machine, in combination, a hold-down or presser, an actuating toggle-mechanism therefor, an actuating screw in operative connection with said toggle-mechanism, and actuating means for the said screw including friction-clutch devices adapted to be varied in driving efficiency, to vary the force transmitted through the screw and connections to the hold-down or presser.

48. In a lasting machine, in combination, a hold-down or presser, an actuating toggle-mechanism therefor, an actuating screw in operative connection with said toggle-mechanism, wheels which respectively are rotated in opposite directions relative to each other, and friction-clutch devices for placing the respective wheels in driving connection with the said screw.

49. A lasting machine having, in combination, a last-support normally held yieldingly in outstanding position relative to the lasting devices, and lasting devices self-conforming to rights and lefts interchangeably and actuated by relative approach between the last-support and the lasting devices.

50. A lasting machine having, in combination, heel and toe lasting devices and a hold-down or presser relatively movable toward and from each other, and a support for said lasting devices collectively having an adjustment to adjust the plane of lasting action.

51. A lasting machine having, in combination, a presser, a last-support, heel and toe lasting devices, and means to adjust the lasting devices collectively bodily toward and from the presser.

52. A lasting machine having, in combination, a presser, a last-support, heel and toe lasting-devices for wiping the upper around a sole upon a last, and means to adjust the lasting devices collectively bodily toward and from the presser to adjust the plane of action of the lasting devices.

53. A lasting machine having, in combination, heel and toe lasting devices, a hold-down or presser, means for causing relative approach of said hold-down or presser and the lasting devices, means to adjust the lasting devices collectively toward and from the hold-down or presser to adjust the plane of action of the lasting devices, and means for bodily adjusting the heel lasting devices independently of the toe lasting devices in the line of the said approach.

54. A lasting machine having, in combination, heel and toe lasting devices, a hold-down or presser, means for causing relative approach of said hold-down or presser and the lasting devices, means to adjust the lasting devices collectively toward and from the hold-down or presser to adjust the plane of action of the lasting devices, and means for bodily adjusting the toe lasting devices independently of the heel lasting devices in the line of the said approach.

55. A lasting machine having, in combination, heel and toe lasting devices, means for supporting a last with upper thereon in position to be operated upon by the said devices, means to adjust the lasting devices collectively toward and from the hold-down or presser to adjust the plane of action of the lasting devices, and means for bodily adjusting the heel lasting devices vertically with relation to the bottom of the last independently of the toe lasting devices.

56. A lasting machine having, in combination, heel and toe lasting devices, means for supporting a last with upper thereon in position to be operated upon by the said devices, means to adjust the lasting devices collectively toward and from the hold-down or presser to adjust the plane of action of the lasting devices, and means for bodily adjusting the toe lasting devices vertically with relation to the bottom of the last independently of the heel lasting devices.

57. A lasting machine having, in combination, a heel-pin, a support therefor, heel lasting devices having a supporting sleeve mounted on said support and adapted to swing transversely concentrically with the heel-pin.

58. A lasting machine having, in combination, a support, heel lasting devices having a supporting sleeve mounted on said support, and a collar in threaded engagement with said support whereby by adjusting said collar the heel lasting devices are adjusted bodily vertically.

59. A lasting machine having, in combination, a heel-pin, a support therefor, heel lasting devices having a supporting sleeve mounted on said support and adapted to swing transversely concentrically with the heel-pin, to conform to the swing of the last, and a collar vertically adjustable on said support whereby the heel lasting devices are adjusted bodily vertically.

60. A lasting machine having, in combination, a heel-pin, a support therefor, heel lasting devices having a supporting sleeve mounted on said support, and a collar in threaded engagement with said support whereby by adjusting said collar the heel lasting devices are adjusted bodily vertically.

61. A lasting machine having, in combination, last-supporting means comprising a toe-rest, a support for said toe-rest, toe lasting devices having a supporting sleeve mounted on said support, and a collar in threaded engagement with said support whereby by adjusting the said collar the toe lasting devices are adjusted bodily vertically.

62. A lasting machine having, in combination, a toe-rest, a support therefor, toe lasting devices having a supporting sleeve mounted on said support and adapted to swing transversely concentrically with the toe-rest to conform to the swing of the last, and a collar vertically adjustable on said support whereby the toe lasting devices are adjusted bodily vertically.

63. A lasting machine having, in combination, a toe-rest, a support therefor, toe lasting devices having a supporting sleeve mounted on said support, and a collar in threaded engagement with said support whereby by adjusting said collar the toe lasting devices are adjusted bodily vertically.

64. A lasting machine having, in combination, last-supporting means, a post located in line with the center of the curve of the heel of the last, a sleeve upon said post, and heel lasting devices supported by said sleeve and adapted to swing transversely concentrically with said curve to conform to the swing of the last.

65. A lasting machine having, in combination, last-supporting means, a post located in line with the center of the curve of the heel of the last, a sleeve upon said post, heel lasting devices supported by said sleeve and adapted to swing transversely concentrically with said curve to conform to the swing of the last, and means for adjusting the said heel lasting devices vertically.

66. A lasting machine having, in combination, last-supporting means, a post located in line with the center of the curve of the heel of the last, a sleeve upon said post, means for adjusting said sleeve vertically upon the post, and heel lasting devices supported by the sleeve and adapted to swing transversely concentrically with said curve to conform to the swing of the last.

67. A lasting machine having, in combination, last-supporting means, a post located in line with the center of the curve of the heel of the last, a sleeve upon said post, a collar in threaded engagement with said post for adjusting said sleeve vertically upon the post, and heel lasting devices supported by the sleeve and adapted to swing transversely concentrically with said curve to conform to the swing of the last.

68. A lasting machine having, in combination, last-supporting means, a post located in line with the center of the curve of the toe of the last, a sleeve upon the said post, toe lasting devices supported by said sleeve and adapted to swing transversely concentrically with said curve to conform to the swing of the last, and means for adjusting the said toe lasting devices vertically.

69. A lasting machine having, in combination, last-supporting means, a post located in line with the center of the curve of the toe of the last, a sleeve upon the said post, means for adjusting said sleeve vertically upon the post, and toe lasting devices supported by the sleeve and adapted to swing transversely concentrically with said curve to conform to the swing of the last.

70. A lasting machine having, in combination, last-supporting means, a post located in line with the center of the curve of the toe of the last, a sleeve upon said post, a collar in threaded engagement with said post for adjusting said sleeve vertically upon the post, and toe lasting devices supported by the sleeve and adapted to swing transversely concentrically with said curve to conform to the swing of the last.

71. A lasting machine having, in combination, last-supporting means, a post adjacent one end of the last, a sleeve upon the said post, a mounting connected to said sleeve with capacity to swing vertically to adjust the inclination of the plane of action of the lasting devices to suit the pitch of the last, and lasting devices carried by said mounting with capacity to rock transversely to suit the twist of the last, and adapted to be swung transversely to conform to the swing of the last.

72. A lasting machine having, in combination, last-supporting means, a post located in line with the center of the curve of one end of the last, a sleeve upon said post, a mounting connected to said sleeve with capacity to swing vertically to adjust the inclination of the plane of action of the lasting devices to suit the pitch of the last, and lasting devices carried by the said mounting with capacity to rock transversely to suit the twist of the last and adapted to be swung transversely to conform to the swing of the last.

73. A lasting machine having, in combination, lasting devices, a carrier therefor, means for actuating the carrier and lasting devices to perform the lasting operation and parallel-motion supporting links on which said carrier swings in being actuated for the lasting operation and retracted.

74. A lasting machine having, in combination, lasting devices, a carrier therefor, a mounting, parallel-motion swinging-link carrier-supporting means in connection with said mounting, actuating means for said carrier and lasting-devices, and means providing for adjustment of the carrier and mounting to suit the pitch of the last.

75. A lasting machine having, in combination, lasting devices, a carrier therefor, last-supporting means, a post adjacent one end of the last, a sleeve on said post, provided with a mounting, and adapted to turn about the post, and parallel-motion swinging-link carrier-supporting means in connection with said mounting.

76. A lasting machine having, in combination, lasting devices, a carrier therefor, last-supporting means, a post adjacent one end of the last, a sleeve on said post adapted to turn about the latter, a mounting connected with said sleeve, parallel-motion swinging-link carrier-supporting means in connection with said mounting, and means to adjust the said mounting to cause the lasting devices to conform to the pitch of the last.

77. A lasting machine having, in combination, lasting devices, a carrier therefor, last-supporting means, a post adjacent one end of the last, a sleeve on said post adapted to turn about the latter, a mounting connected pivotally with said sleeve, parallel-motion swinging-link carrier-supporting means in connection with said mounting, and adjusting means for said mounting to adapt the lasting devices to the pitch of the last.

78. A lasting machine having, in combination, lasting devices, a carrier therefor, and a toggle for actuating said carrier and lasting devices to perform the lasting opertation.

79. A lasting machine having, in combination, lasting devices, a carrier therefor, a toggle for actuating said carrier and lasting devices to perform the lasting operation, and means for varying the effective length of the toggle.

80. A lasting machine having, in combination, lasting devices, a carrier therefor, a toggle for actuating the carrier and lasting devices to perform the lasting operation, and means for varying the effective length of one of the toggle-members to thereby vary the effect of the toggle.

81. A lasting machine having, in combination, lasting devices, a carrier therefor, a toggle for actuating the carrier and lasting devices to perform the lasting operation, and a combined toggle-operating handle and adjusting device for varying the effective length of the toggle.

82. A lasting machine having, in combination, lasting devices, a carrier therefor, a toggle for actuating the carrier and lasting devices to perform the lasting operation, the said toggle comprising link-members pivotally connected together, and a hand-lever with which one of said link-members is connected by a screw-connection providing for adjustment of the effective length of the toggle by the turning of the handle-portion of said hand-lever.

83. A lasting machine having, in combination, lasting devices, a carrier therefor mounted to swing, a link operatively connecting with said carrier and forming a toggle-member, a second toggle-member pivotally connecting with the first, a pivotally supported mounting, and a hand-lever combined with said mounting, rotatable, and in screw-threaded engagement with the second toggle-member, whereby by means of the hand-lever the toggle may be operated to actuate the lasting devices, and by rotating the handle the toggle-length may be adjusted.

84. A lasting machine having, in combination, lasting devices, swinging-link parallel-motion supporting means therefor, a toggle comprising a member operatively connecting with said lasting devices, a second member pivotally engaged with the first, and a pivotally supported mounting, and an operating lever or handle combined with said mounting, and in screw-threaded adjustable connection with the second toggle-member.

85. A lasting machine having, in combination, lasting devices, parallel-links supporting said devices, a toggle comprising a member operatively connecting with said parallel-links, a second member pivotally engaged with the first, and a pivotally supported mounting, and an operating lever or handle combined with said mounting and in adjustable screw-threaded connection with the second toggle-member.

86. A lasting machine having, in combination, last-supporting means, wiper lasting-devices, and means for actuating said lasting-devices to wipe the edge of the upper around the edge of the last and during the wiping action press the wipers more closely toward the bottom of the last.

87. A lasting machine having, in combination, last-supporting means, wiper lasting devices, swinging carrying means for said devices constructed to permit the wiping action and cause the wipers to press more closely toward the bottom of the last in the final portion of such action.

88. A lasting machine having, in combination, last-supporting means, wiper lasting devices, and parallel-link supporting means for said devices operating in the final portion of the wiping action to press the wipers more closely toward the bottom of the last.

89. A lasting machine having, in combination, an actuating carrier, a plate movably mounted thereon, arms pivotally connected to said plate, a compressor-band having its opposite end-portions connected to said arms, and a spring cushion between a part of said carrier and a part of said plate through which movement is transmitted from the carrier to the plate and band.

90. A lasting machine having, in combination, an actuating carrier, a compressor-band carrier movably combined therewith, arms pivotally connected to said compressor-band carrier, a compressor-band having its opposite end-portions connected to said arms, a spring cushion between parts of the respective carriers and through which movement is transmitted from the actuating carrier to the compressor-band carrier, wipers, carrying-levers therefor connected to travel with the actuating carrier, a spring acting upon said levers to open the wipers, and means carried by the compressor-band carrier acting upon the said levers in the independent movement of the actuating carrier to occasion the closing movement of the wipers.

91. A lasting machine having, in combination, an actuating carrier having upstanding lugs, a plate movably mounted on said carrier and having openings through which said lugs project, arms pivotally connected to said plate, a compressor-band having its opposite end-portions connected to said arms, a pin carried by said lugs and fitting bearings in said plate, permitting the plate to rock transversely to conform to the twist of the last, the said pin adapted to slide lengthwise in said bearings, a spring cushion through which movement is transmitted from the actuating carrier to the said plate, a second plate mounted upon the compressor-band plate and engaged and actuated by one of the lugs of the actuating carrier, wiper-carrying levers pivoted to said second plate, wipers combined with said levers, a spring acting to open the levers and wipers, and means carried by the compressor-band plate acting upon the levers in the independent movement of the actuating carrier to occasion the closing movement of the wipers.

92. A lasting machine having lasting devices comprising a floating flexible wiper-chain composed of a series of links connected together so as to be capable of play or flexure in the plane of the chain, whereby the chain is enabled to conform itself closely to the contour of the exterior of the last.

93. A lasting machine having, in combination, a transversely floating flexible wiper-chain composed of a series of links jointed together and capable of play or flexure in the plane of the chain, means for moving said wiper-chain into position to partly encircle a last with upper thereon, and means to occasion relative movement between the last and upper and the encircling wiper-chain to wipe the upper upward into place about the last.

94. A lasting machine having, in combination, a transversely floating flexible wiper-chain composed of a series of links jointed together and capable of play or flexure in the plane of the chain, said chain adapted to partly encircle a last with upper thereon, and means for actuating said wiper-chain to wipe the upper around the edge of the last and crimp it over the bottom thereof or a sole thereon.

95. A lasting machine having, in combination, a transversely floating flexible wiper-chain composed of a series of links jointed together and capable of play or flexure in the plane of the chain, said chain adapted to partly encircle a last with upper thereon, means to occasion relative movement between the last and upper and the encircling wiper-chain to wipe the upper upward into place about the last, and means for moving said wiper-chain inward into position to engage with the upper around the contour of the last for the wiping action, and for moving it farther inward to wipe the upper around the edge of the last and crimp it over the bottom thereof or a sole thereon.

96. A lasting machine having, in combination, a transversely floating flexible wiper-chain composed of a series of links jointed together and capable of play or flexure in the plane of the chain, said chain confined to prevent it from being sprung either downward or upward, means for moving said wiper-chain into position to partly encircle a last with upper thereon, and means to occasion relative movement between the last and upper and the encircling wiper-chain to wipe the upper upward into place about the last.

97. A lasting machine having, in combination, a wiper-carrying plate, opposite arms hung to said plate, and a transversely floating flexible wiper-chain which conforms to the contour of the end-portion of the last, said chain composed of a series of links jointed together and capable of lateral play or flexure in the plane of the chain.

98. A lasting machine, having, in combination, a wiper-carrying plate, a transversely floating flexible wiper-chain composed of a series of links jointed together and capable of play or flexure in the plane of the chain, said chain adapted to partly encircle a last with upper thereon, and means to occasion relative movement between the last and upper and the encircling wiper-chain, at first with yielding action to wipe the upper upward into place about the last, and then with positive action to wipe the upper around the edge of the last and crimp it over the bottom thereof or a sole thereon.

99. A lasting machine having, in combination, a wiper-band which embraces one end and portions of two sides of a last with the upper thereon, means for producing relative movement of said wiper-band and last causing said last to enter the said wiper-band, and means acting during such relative movement to close the wiper-band against the upper and last to engage with the upper to wipe the upper upwardly into place about the last.

100. A lasting machine having, in combination, a wiper-band which embraces one end and portions of two sides of a last with upper thereon, means for producing relative movement of said wiper-band and last causing said last to enter the said wiper-band, and means actuated through such entrance to close the wiper-band against the upper and last to engage with the upper to wipe the upper upward into place about the last.

101. A lasting machine having, in combination, a wiper-band which embraces one end and portions of two sides of a last with upper thereon, means for producing relative movement of said wiper-band and last causing said last to enter the inclosure of the wiper-band, and a last-support actuating said wiper-band to close against the upper and last so as to engage with the upper to wipe the latter upward into place about the last.

102. A lasting machine having, in combination, a wiper-band, means for producing relative movement of said wiper-band and a last with upper thereon causing said last to enter the inclosure of the wiper-band, and a toe-rest engaged by the last and actuating the wiper-band to close it against the upper and last so as to engage with the upper to wipe the latter upward into place about the last.

103. A lasting machine having, in combination, a wiper-band, swinging arms connected therewith, and means actuated by the entrance of a last with upper thereon into the inclosure of said wiper-band to move the opposite portions of the wiper-band against the upper and last.

104. A lasting machine having, in combination, a wiper-band, swinging arms connected therewith, and a toe-rest operated by the entrance of a last with upper thereon into the inclosure of the wiper-band and acting to move the opposite portions of the wiper-band inward against the upper and last.

105. A lasting machine having, in combination, a wiper-band, swinging arms connected therewith, a member connected with said arms and normally acting to keep the wiper-band expanded, and a toe-rest operated by the entrance of a last with upper thereon into the inclosure of the wiper-band and actuating the said member to in turn actuate said swinging arms to close the wiper-band into wiping engagement with the said upper.

106. A lasting machine having, in combination, a wiper-band, swinging arms connected therewith, a member linked to projections from said arms and spring-actuated to keep the wiper-band normally expanded, and a toe-rest in yielding connection with said member and operated by the entrance of a last with upper thereon into the inclosure of the wiper-band to actuate the said member to in turn actuate the swinging arms to close the wiper-band into wiping engagement with the said upper.

107. A lasting machine having, in combination, a wiper-band which incloses one end and portions of the length of a last, swinging arms connected with said wiper-band and spring-actuated to hold the wiper-band inward toward the last, and means for producing relative approach of a last with upper thereon and said wiper-band to occasion entrance of the last and upper within the inclosure of the wiper-band and the wiping of the upper upward into place around the last.

108. A lasting machine having, in combination, a wiper-band which incloses one end and portions of the length of a last, and inwardly-inclined swinging posts supporting the wiper-band by their upper portions and spring-actuated to hold the wiper-band contracted inwardly for yielding wiping engagement with the upper upon a last as such last enters the inclosure of the wiper-band.

109. A lasting machine having, in combination, a last-support, a wiper, and a post inclining from its pivot upward and inward toward the last-support and supporting said wiper by its upper end and spring-actuated to hold the wiper normally inward for yielding wiping engagement with the upper upon a last as such last is depressed relative to the wiper.

110. A lasting machine having, in combination, a wiper-band adapted to encircle one end and extend along the sides of a last, crimping wipers, and means for producing relative approach between the last and the wiper-devices and thereby causing the last with upper thereon to enter within the wiper-devices, whereby a preliminary wiping of the upper into place about the last is effected, and means for operating said crimping wipers to wipe over and crimp the portions of upper projecting at the bottom of the last.

111. A lasting machine having, in combination, a wiper-band adapted to encircle one end and extend along the sides of a last, crimping wipers, means for producing relative approach between the last and the wiper-devices and thereby causing the last with upper thereon to enter within the wiper-devices, whereby a preliminary wiping of the upper into place about the last is effected, means for operating said crimping wipers to wipe over and crimp the portions of upper projection at the bottom of the last, and a mounting for said wiper-band and crimping-wipers in common, adjustable to conform to the pitch and the swing of the last.

112. A lasting machine having, in combination, a movable last-support, and waist-wiper devices actuated by said last-support to wipe the waist-portion of the upper into place about the last as the last and upper thereof enter between the said devices.

113. A lasting machine having, in combination, wiper devices constructed to close against a last with upper thereon as it enters between them, and to move in the same direction as the last and upper but at slower speed, thereby wiping the upper into place about the last.

114. A lasting machine having, in combination, a movable last-support, and wiper devices arranged to close against a last and upper as they enter between them, and actuated from said last-support to move in the same direction as the last and upper but at slower speed, thereby wiping the upper into place about the last.

115. A lasting machine having, in combination, waist-wiper devices constructed to close against a last with upper thereon entered between them, and to move in the same direction as the last and upper at slower speed, thereby wiping the waist of the upper into place about the last.

116. A lasting machine having, in combination, a movable last-support, and waist-wiper devices arranged to close against a last and upper as they enter between them, and actuated from said last-support to move in the same direction as the last and upper at slower speed, thereby wiping the waist of the upper into place about the last.

117. A lasting machine having, in combination, a wiper, a movable last-support, and means for actuating said wiper to move in unison with the last-support, in the same direction, at a slower rate of speed, whereby the wiping action results from the difference in the rates of movement.

118. A lasting machine having, in combination, a movable last-support, a wiper-carrier, and a wiper yieldingly mounted on said wiper-carrier, the said wiper-carrier operated by the moving last-support to move the wiper in the same direction at a slower rate of speed, whereby the wiping action results from the difference in the rates of movement.

119. A lasting machine having, in combination, a movable last-support, a wiper, and a swinging member actuated by said last-support in the movement of the latter and actuating the wiper with reduction in the leverage whereby the wiper is caused to move in the same direction as the last but at less speed.

120. A lasting machine having, in combination, a movable last-support, a swinging wiper-actuating member to which power is communicated from the last-support, and a wiper connected with said member at a point between that of the application of said power and the pivotal axis of the said member.

121. A lasting machine having, in combination, a movable last-support, a swinging wiper-carrier actuated by power communicated from said last-support in the movement of the latter, and a wiper connected with the wiper-carrier between the pivotal axis thereof and the point of application of such power, and thereby caused to move in the same direction as the last-support but at a different rate of speed.

122. A lasting machine having, in combination, a movable last-support, a swinging wiper-carrier actuated by power communicated thereto from said last-support, and a yieldingly-backed wiper connected with the wiper-carrier between the pivotal axis of the latter and the point of application of such power, and thereby caused to move in the same direction as the last-support but at a different rate of speed.

123. A lasting machine having, in combination, a wiper-support, and a wiper mounted thereon to swivel on a vertical axis and thereby accommodate itself to the longitudinal contour of the last.

124. A lasting machine having, in combination, a movable last-support, a swinging wiper-carrier actuated by power communicated thereto from said last-support, a yieldingly-backed wiper-support connected with said wiper-carrier between the pivotal axis of the latter and the point of application of the said power, and a wiper mounted on said wiper-support with capacity to swivel on a vertical axis and thereby accommodate itself to the shape of the last.

125. A lasting machine having, in combination, a movable last-support, opposite swinging wiper-actuating members actuated by power communicated thereto from said last-support, and wipers connected with the respective members between the pivotal axes of the latter and the points of application of the said power, and thereby caused to move in the same direction as the last but at a different rate of speed.

126. A lasting machine having, in combination, a movable last-support, oppositely pivoted swinging wiper-carriers actuated by power communicated to their inner portions from said last-support, and yieldingly-backed wipers connected with the respective wiper-carriers between the power-receiving points and the pivotal axes, whereby the wipers are caused to move in the same direction as the last but at less speed.

In testimony whereof I affix my signature in presence of two witnesses.

FRANK W. MERRICK.

Witnesses:
CHAS. F. RANDALL,
ELLEN O. SPRING.